(12) United States Patent
Sun et al.

(10) Patent No.: US 12,573,910 B2
(45) Date of Patent: Mar. 10, 2026

(54) COVER PLATE ASSEMBLY, STATOR, ELECTRIC MOTOR, COMPRESSOR AND VEHICLE

(71) Applicants:ANHUI WELLING AUTO PARTS CO., LTD., Hefei (CN); GUANGDONG WELLING AUTO PARTS CO., LTD., Foshan (CN)

(72) Inventors: Guowei Sun, Hefei (CN); Kaicheng Yang, Hefei (CN)

(73) Assignees: ANHUI WELLING AUTO PARTS CO., LTD., Hefei (CN); GUANGDONG WELLING AUTO PARTS CO., LTD., Foshan (CN)

( * ) Notice: Subject to any disclaimer, the term of this patent is extended or adjusted under 35 U.S.C. 154(b) by 266 days.

(21) Appl. No.: 18/237,079

(22) Filed: Aug. 23, 2023

(65) Prior Publication Data

US 2023/0396121 A1      Dec. 7, 2023

Related U.S. Application Data

(63) Continuation of application No. PCT/CN2022/087822, filed on Apr. 20, 2022.

(30) Foreign Application Priority Data

May 17, 2021    (CN) .......................... 202110536073.2
May 17, 2021    (CN) .......................... 202121049558.0

(51) Int. Cl.
*H02K 3/50*          (2006.01)
*H02K 5/22*          (2006.01)

(52) U.S. Cl.
CPC .............. *H02K 5/225* (2013.01); *H02K 3/50* (2013.01)

(58) Field of Classification Search
CPC ........... H02K 5/10; H02K 5/22; H02K 5/225; H02K 3/50
See application file for complete search history.

(56) References Cited

U.S. PATENT DOCUMENTS

2002/0049004 A1    4/2002    Davis et al.
2005/0124203 A1    6/2005    Herrick et al.
(Continued)

FOREIGN PATENT DOCUMENTS

CN          104838139 A      8/2015
CN          205105026 U      3/2016
(Continued)

OTHER PUBLICATIONS

Yang, Machine Translation of CN205105026, Mar. 2016 (Year: 2016).*

(Continued)

*Primary Examiner* — Eric Johnson
(74) *Attorney, Agent, or Firm* — Scully, Scott, Murphy & Presser, P.C.

(57)          ABSTRACT

A cover plate assembly, a stator, an electric motor, a compressor and a vehicle are provided. The cover plate assembly is used for the electric motor having a lead. The cover plate assembly has a first housing and a second housing. The first housing has a first passage portion. The second housing is detachably connected to the first housing. A sealing cavity and a second passage portion are jointly enclosed between the first housing and the second housing. The first passage portion and the second passage portion are both in communication with the sealing cavity. The lead of the electric motor extends into the sealing cavity through the second passage portion.

19 Claims, 11 Drawing Sheets

(56) References Cited

U.S. PATENT DOCUMENTS

| | | | | |
|---|---|---|---|---|
| 2015/0214805 A1* | 7/2015 | Kobayashi | ........... | F04B 39/121 |
| | | | | 310/71 |
| 2015/0303762 A1 | 10/2015 | Hagita et al. | | |
| 2021/0099042 A1* | 4/2021 | Takayama | ........... | F04C 18/0215 |

FOREIGN PATENT DOCUMENTS

| | | | | | |
|---|---|---|---|---|---|
| CN | 108075253 | A | 5/2018 | | |
| CN | 110535274 | A | 12/2019 | | |
| CN | 211981638 | U | 11/2020 | | |
| CN | 113224896 | A | 8/2021 | | |
| CN | 215733831 | U | 2/2022 | | |
| FR | 3058582 | A1 | 5/2018 | | |
| FR | 3069963 | A1 * | 2/2019 | .......... | H01R 13/506 |
| JP | 2013172555 | A | 9/2013 | | |
| KR | 20140095798 | A * | 8/2014 | ............. | F04C 23/02 |
| WO | WO-2014068914 | A1 * | 5/2014 | ............. | F01C 21/10 |

OTHER PUBLICATIONS

Jung, Machine Translation of KR20140095798, Aug. 2014 (Year: 2014).*

Walme, Machine Translation of FR3069963, Feb. 2019 (Year: 2019).*

International Search Report dated Jun. 22, 2022 issued in PCT/CN2022/087822.

Extended European search report dated Jul. 2, 2024 received in European Patent Application No. EP 22803724.8.

Second Office Action dated Jun. 10, 2205 received in Chinese patent Application No. 202110536073.2.

First Office Action dated Feb. 21, 2025 for Chinese Patent Application No. 202110536073.2.

Third Office Action dated Oct. 30, 2025 received in Chinese Patent Application No. 202110536073.2.

\* cited by examiner

204

202

210

206

200

204

202

206

200

200

COVER PLATE ASSEMBLY, STATOR, ELECTRIC MOTOR, COMPRESSOR AND VEHICLE

CROSS-REFERENCE TO RELATED APPLICATIONS

This application is a continuation application of PCT International Patent Application No. PCT/CN2022/087822, filed on Apr. 20, 2022, which claims priority to Chinese Patent Application No. 202110536073.2 filed with China National Intellectual Property Administration on May 17, 2021 and entitled "COVER PLATE ASSEMBLY, STATOR, ELECTRIC MOTOR, COMPRESSOR AND VEHICLE", and claims priority to Chinese Patent Application No. 202121049558.0 filed with China National Intellectual Property Administration on May 17, 2021 and entitled "COVER PLATE ASSEMBLY, STATOR, ELECTRIC MOTOR, COMPRESSOR AND VEHICLE", the entire contents of each of which are incorporated herein by reference. No new matter has been introduced.

FIELD

The present disclosure relates to the field of electric motor technologies, and particularly relates to a cover plate assembly, a stator, an electric motor, a compressor and a vehicle.

BACKGROUND

Currently, the lead of an electric motor is electrically connected to the wiring portions of other devices.

In the related art, due to the lack of a device for sealing the connection between a lead and a wiring portion, the media such as oil and refrigerant can easily enter the connection between the lead and the wiring portion, and this leads to the sharp drop of the insulation resistance of the stator of an electric motor, and affects the use performance of a product.

SUMMARY

The present disclosure aims to solve at least one of the problems that exist in the prior art or related art.

Thus, a first aspect of the present disclosure proposes a cover plate assembly.

A second aspect of the present disclosure proposes a stator.

A third aspect of the present disclosure proposes an electric motor.

A fourth aspect of the present disclosure proposes a compressor.

A fifth aspect of the present disclosure proposes a vehicle.

In view of this, the first aspect of the present disclosure proposes a cover plate assembly for an electric motor, and the electric motor comprises a lead, and the cover plate assembly comprises: a first housing provided with a first passage portion; and a second housing detachably connected to the first housing, and a sealing cavity and a second passage portion are jointly enclosed between the first housing and the second housing, and the first passage portion and the second passage portion are both in communication with the sealing cavity; and the second passage portion is used for the lead to extend into the sealing cavity.

The cover plate assembly proposed in the present disclosure comprises the first housing and the second housing, and the sealing cavity and the second passage portion are jointly enclosed between the first housing and the second housing, and the first housing is provided with the first passage portion, and the first passage portion and the second passage portion are both in communication with the sealing cavity. The lead of the electric motor extends into the sealing cavity through the second passage portion, and the wiring portion of a device in cooperative connection with the electric motor is inserted into the sealing cavity through the second passage portion to be electrically connected to the lead. In some embodiments, the first housing is a receptacle, and the second housing is an insulating end cover.

Since the connection between the lead and the wiring portion is located inside the sealing cavity, the sealing cavity can effectively prevent external media such as oil and refrigerant from penetrating into the connection between the lead and the wiring portion, and then has an excellent sealing effect, and the situation where the insulation resistance of the stator of the electric motor drops sharply due to the penetration of the media such as oil and refrigerant into the connection between the lead and the wiring portion is avoided, which is beneficial to ensure the use performance and reliability of the electric motor.

It can be understood that the cover plate assembly is used in cooperation with the insulating support of the electric motor, and the cover plate assembly has a function of fixing and limiting the lead, and this can ensure the cooperating dimension of the device connected to the lead and the electric motor, to avoid the occurrence of the situation where the displacement of the lead disconnects the lead from the wiring portion, and provides an effective structural support for the stability and the reliability of the use of products. In addition, the first housing cooperates with the second housing so that the connection between the lead and the wiring portion is located inside the sealing cavity, and this arrangement can prevent an external force from directly acting on the lead and the wiring portion, and thus has a protection function and is beneficial to extend the service life of the products.

Furthermore, the first housing is detachably connected to the second housing, which helps the disassembly and assembly of the lead with respect to the cover plate assembly, and has the advantage of low production cost; in addition, the arrangement is convenient for the cleaning and maintenance of the cover plate assembly.

The cover plate assembly according to the present disclosure can further comprise the following additional features.

In the above embodiment, furthermore, a portion of the first housing protrudes to form a first mounting groove; a portion of the second housing protrudes to form a second mounting groove, the first mounting groove extends into the second mounting groove, and the sealing cavity is enclosed between the inner wall surface of the second mounting groove and the inner wall surface of the first mounting groove; and the protruding direction of the first mounting groove is opposite to the protruding direction of the second mounting groove.

In this embodiment, the first housing is formed with the first mounting groove, the second housing is formed with the second mounting groove, when the first housing is in cooperative connection with the second housing, the first mounting groove of the first housing extends into the second mounting groove, to enclose the sealing cavity for accommodating the lead between the inner wall surface of the first mounting groove and the inner wall surface of the second mounting groove.

The protruding direction of the first mounting groove is opposite to the protruding direction of the second mounting groove, i.e., the first mounting groove is in snap-fit connection with the second mounting groove, the inner wall surface of the first mounting groove cooperates with the inner wall surface of the second mounting groove to achieve an effective protection function, and even if the media such as oil and refrigerant penetrate into the cover plate assembly, the outer wall surface of the second mounting groove can further have a function of blocking the media, to ensure the sealing effect of the sealing cavity.

In some embodiments, the outer wall surface of the first mounting groove leans against the inner wall surface of the second mounting groove, to improve the sealing performance of the sealing cavity.

In any of the above embodiments, furthermore, the first housing comprises a mounting plate, the first mounting groove is located at one side of the mounting plate, a portion of the mounting plate protrudes out of the side portion of the first mounting groove, and the top wall of the second mounting groove abuts on the portion of the mounting plate which protrudes out of the side portion of the first mounting groove.

In this embodiment, through reasonably disposing the cooperating structure of the first housing and the second housing, the first housing comprises the mounting plate, the first mounting groove is located at one side of the mounting plate; after the first housing and the second housing are assembled, the top wall of the second mounting groove abuts on the portion of the mounting plate which protrudes out of the side portion of the first mounting groove. The top wall of the second mounting groove is in cooperative connection with the mounting plate to achieve the sealing effect, and thus, even if the media such as oil and refrigerant penetrate into the cover plate assembly and the cumulative height of the media is relatively large, the media can still be blocked outside the sealing cavity by the top wall of second mounting groove and the mounting plate which abut on each other, to achieve a good sealing effect.

In some embodiments, the top wall of the second mounting groove is in surface contact with the portion of the mounting plate which protrudes out of the side portion of the first mounting groove, and this arrangement enlarges the cooperating area and the cooperating angle between the first housing and the second housing, achieves sealing at multiple angles, and helps improve the effectiveness and feasibility of the sealing of the cover plate assembly.

In some embodiments, the top wall of the second mounting groove comprises any of or the combination of a plane, a curved surface and a folded surface.

In some embodiments, the wall surface of a first concave portion is attached to the circumferential side wall of the lead.

In any of the above embodiments, furthermore, the first housing is provided with a first baffle, the first baffle and the first mounting groove are located at the same side of the mounting plate, the first baffle is provided with the first concave portion, and the first concave portion is in communication with the first mounting groove; the second housing is provided with a second baffle, the second baffle is provided with a second concave portion at the portion corresponding to the first concave portion, the second concave portion is in communication with the second mounting groove, the concaving direction of the first concave portion is opposite to that of the second concave portion, and the second passage portion is enclosed by the first concave portion and the second concave portion.

In this embodiment, the first housing is provided with the first baffle, the second housing is provided with the second baffle, the first concave portion is provided in the first baffle, the second concave portion is provided in the second baffle, and the concaving direction of the first concave portion is opposite to that of the second concave portion; the wall surface of the first concave portion and the wall surface of the second concave portion are both in cooperative connection with the outer peripheral wall of the lead. That is, the first concave portion cooperates with the second concave portion for allowing the lead to extend into the sealing cavity.

The first baffle cooperates with the second baffle to achieve multiple sealing functions, which is beneficial to improve the sealing effect of the cover plate assembly to the lead. In addition, the concaving direction of the first concave portion is opposite to that of the second concave portion, that is, the first concave portion cooperates with the second concave portion to support and fix the lead.

In any of the above embodiments, furthermore, the first concave portion cooperates with the second concave portion to compress the lead located inside the second passage portion.

In this embodiment, the lead comprises a conducting wire, a sleeve and a terminal, the conducting wire is electrically connected to the terminal, the sleeve is put around the outer side of the conducting wire, and the sleeve is located at one side of the terminal. The first concave portion cooperates with the second concave portion to compress the lead located inside the passage portion, the sleeve is deformed due to stress, and thus, the outer wall surface of the sleeve is closely attached to the first concave portion and the second concave portion, to achieve the sealing effect. That is, the second passage portion is in interference fit with the lead.

Furthermore, since the concaving direction of the first concave portion is opposite to that of the second concave portion, the lead can be compressed from multiple directions and multiple angles, to effectively prevent the media such as oil and refrigerant from penetrating into the cover plate assembly.

The second passage portion cooperates with the sealing cavity to achieve a multiple sealing effect, which is beneficial to improve the sealing effect of the cover plate assembly for the connection between the lead and the wiring portion.

In any of the above embodiments, furthermore, the number of the second baffles is multiple; and the multiple baffles are arranged alternatively along the direction from the second baffles to the first baffle.

In this embodiment, the number of the second baffles is multiple, through reasonably disposing the cooperating structure of the multiple second baffles, the multiple second baffles are arranged alternatively along the direction from the second baffles to the first baffle, and this arrangement enlarges the cooperating area between the second passage portion and the lead, to ensure the supporting and fixing effect of the second passage portion to the lead.

In addition, the multiple second baffles are arranged alternatively, and this arrangement is equivalent to defining a plurality of concave structures, the media such as oil and refrigerant need to cross the plurality of concave structures one by one to penetrate into the cover plate assembly, that is, this arrangement achieves multiple sealing.

In some embodiments, the second mounting groove comprises a third wall and a fourth wall, the third wall and the fourth wall are opposite to each other and arranged alternatively, the second baffle which is located at the outermost side is connected with both the third wall and the fourth wall, that is, the second baffle at the outermost side constitutes the side wall of the second mounting groove on one side, and the remaining second baffles are all located inside the second mounting groove.

In any of the above embodiments, furthermore, the number of the first baffles is two, and the multiple second baffles are all located between the two first baffles.

In this embodiment, the number of the first baffles is two, one of the two first baffles is located at one side of the multiple second baffles, and the other of the two first baffles is located at the other side of the multiple second baffles, the two first baffles cooperate with the multiple second baffles, and this arrangement is equivalent to defining a plurality of concave structures, the media such as oil and refrigerant need to cross the plurality of concave structures one by one if the media penetrate into the cover plate assembly, that is, this arrangement achieves multiple sealing.

In some embodiments, one of the two first baffles extends into the second mounting groove, and the other of the two first baffles is located at the outer side of the second mounting groove.

In any of the above embodiments, furthermore, the first housing further comprises a convex portion, the convex portion is connected to the mounting plate, the convex portion and the first mounting groove are located at the two opposite sides of the mounting plate, the first passage portion is a through-hole that penetrates through the convex portion and the bottom wall of the first mounting groove.

In this embodiment, the first housing further comprises the convex portion, the convex portion is located at one side of the mounting plate, the first mounting groove is located at the other side of the mounting plate; the first passage portion is a through-hole that penetrates through the convex portion and the bottom wall of the first mounting groove. That is, the first passage portion extends from the sealing cavity towards the direction departing from the sealing cavity, and thus, the media such as oil and refrigerant outside the cover plate assembly need to cross the convex portion to enter into the first passage portion, and this arrangement is beneficial to improve the sealing effect of the cover plate assembly.

Furthermore, the first passage portion is the through-hole, the through-hole can penetrate through the convex portion and the bottom wall of the first mounting groove, and thus, the wiring portion of the device which is electrically connected to the electric motor is inserted into the through-hole from top to bottom, and enters the sealing cavity to be electrically connected to the lead in the sealing cavity.

In any of the above embodiments, furthermore, the mounting plate comprises a first plate body and a second plate body from the convex portion to the edge of the first housing; the first plate body is located above the second plate body in the direction from the first housing to the second housing; and the convex portion is connected to the first plate body.

In this embodiment, the mounting plate comprises the first plate body and the second plate body, and the second plate body is located at one side of the first plate body; the first plate body is located above the second plate body in the direction from the first housing to the second housing, and the convex portion is connected to the first plate body located at a higher position, and thus, the media such as oil and refrigerant outside the cover plate assembly need to sequentially cross the first plate body and the convex portion to enter into the first passage portion, and this arrangement is beneficial to improve the sealing effect of the cover plate assembly.

In any of the above embodiments, furthermore, along the direction from the first housing to the second housing, the portion of the bottom wall of the second mounting groove corresponding to the through-hole is located above the portion of the bottom wall of the second mounting groove corresponding to the second passage portion.

In this embodiment, through reasonably disposing the structure of the second mounting groove, the bottom wall of the second mounting groove comprises the portion corresponding to the through-hole and the portion corresponding to the second passage portion, and the portion of the bottom wall of the second mounting groove corresponding to the through-hole is located above the portion of the bottom wall of the second mounting groove corresponding to the second passage portion. That is, the portion of the lead used for electrical connection with the wiring portion is located at a higher position, and thus, even if the media such as oil and refrigerant penetrate into the cover plate assembly, they can flow to the connection between the lead and the wiring portion only when the cumulative height of the media such as oil and refrigerant reaches a certain value. This arrangement can effectively avoid the situation where the insulation resistance of the stator of the electric motor drops sharply, which is beneficial to ensure the use performance and reliability of the electric motor.

In any of the above embodiments, furthermore, the cover plate assembly further comprises: a first connecting portion provided in the first housing; and a second connecting portion provided in the second housing, and the first housing is detachably connected to the second housing through the first connecting portion and the second connecting portion.

In this embodiment, the cover plate assembly further comprises the first connecting portion and the second connecting portion, and the first connecting portion is provided in the first housing, the second connecting portion is provided in the second housing, and the first connecting portion is detachably connected to the second connecting portion, to further achieve the purpose that the first housing is detachably connected to the second housing. This arrangement can ensure the cooperating dimension of the first housing and the second housing, and provides an effective structural support for the effectiveness and feasibility of enclosing the sealing cavity between the first housing and the second housing.

It can be understood that the first housing is detachably connected to the second housing through the first connecting portion and the second connecting portion, to achieve enclosing the sealing cavity between the first housing and the second housing. When the cover plate assembly needs to be disassembled, the binding force between the first housing and the second housing can be removed through applying an external force to the first housing and/or the second housing, to further achieve the purpose of separating the first housing from the second housing. This structural arrangement has assembly reliability, helps the assembly and the subsequent disassembly and maintenance, and is convenient for the adjustment and calibration of a displacing housing with respect to the second housing in the assembling process.

In any of the above embodiments, furthermore, one of the first connecting portion and the second connecting portion is a buckle, the other one is a buckling position portion, and the buckle is in buckling cooperation with the buckling position portion.

In this embodiment, another connecting method of the first housing and the second housing is in some embodiments defined; the first housing is in buckling connection with the second housing, and one of the first connecting portion and the second connecting portion is a buckle, the other one is a buckling position portion, and in some embodiments, the first housing is provided with the buckling position portion, the second housing is provided with the buckle; or the second housing is provided with the buckling position portion, and the first housing is provided with the buckle. It is beneficial to the rapid disassembling and assembling of the first housing and the second housing.

In any of the above embodiments, furthermore, both the first connecting portion and the second connecting portion are threaded holes, the cover plate assembly further comprises a threaded component, and the threaded component is in threaded connection and cooperation with the threaded holes.

In this embodiment, another connecting method of the first housing and the second housing is in some embodiments defined. The first housing is connected to the second housing through the threaded component. It is convenient for rapid disassembling of the first housing and the second housing while the stability of the connection between the first housing and the second housing is ensured.

In some embodiments, it is in some embodiments defined that the threaded component comprises a screw, both the first housing and the second housing are disposed with the threaded holes, and the screw is in threaded connection with the threaded holes. By using the screw connecting, it is convenient for assembling, saves costs, simplifies the production technology, improves the production efficiency and further helps the subsequent disassembling and maintenance.

In any of the above embodiments, furthermore, one of the first connecting portion and the second connecting portion is a limiting rib, the other one is a limiting socket, and the limiting rib can be inserted into the limiting socket.

In this embodiment, it is defined that the first housing can be connected to the second housing through the cooperation method of the limiting socket and the limiting rib. By in some embodiments disposing the limiting rib and the limiting socket which cooperates with each other, the first housing is in inserting connection with the second housing. It is convenient for assembling and is beneficial to the rapid disassembling and assembling of the first housing and the second housing, and helps the first housing rapidly find the position of the limiting socket to be assembled on the second housing.

In any of the above embodiments, furthermore, the second connecting portion is provided on the outer wall surface of the second mounting groove, and the portion of the first housing corresponding to the second connecting portion is provided with the first connecting portion.

In this embodiment, through reasonably disposing the position relation between the first connecting portion and the second portion, the outer wall surface of the second mounting groove is provided with the second connecting portion, the first housing is provided with the first connecting portion, and the first connecting portion is disposed corresponding to the second connecting portion. Thus, after the first housing and the second housing are assembled, the first connecting portion on the first housing is in cooperative connection with the second connecting portion which is provided on the outer wall surface of the second mounting groove.

In some embodiments, the numbers of the sealing cavities, the first connecting portions and the second connecting portions are all multiple, at least one second connecting portion is provided on the outer wall surface of each second mounting groove, and each second connecting portion is detachably connected to one of the first connecting portions.

That is, there are N sealing cavities, and then there are N cooperative connections of the first housing and the second housing.

In any of the above embodiments, furthermore, the first housing is provided a first guiding portion, the second housing is provided with a second guiding portion, and the first guiding portion and the second guiding portion are connected in a cooperative manner.

In this embodiment, through reasonably disposing the cooperating structure of the first housing and the second housing, the first housing is provided with the first guiding portion, the second housing is provided with the second guiding portion, the first guiding portion and the second guiding portion have the aim of guiding the cooperative connection between the first housing and the second housing, so that the cooperating dimension of the first housing and the second housing is effectively ensured, and the effectiveness of the formed sealing cavities is ensured. This arrangement simplifies the assembling process of the first housing and the second housing, reduces the assembling difficulty of the first housing and the second housing, and helps improve the rapid disassembly and assembly of the first housing and the second housing.

In any of the above embodiments, furthermore, one of the first guiding portion and the second guiding portion is a guiding post, the other one is a guiding hole, and the guiding post can extend into the guiding hole.

In this embodiment, through reasonably disposing the cooperating structure of the first guiding portion and the second guiding portion, the first guiding portion is a guiding post, and the second guiding portion is a guiding hole; or the first guiding portion is a guiding hole, and the second guiding portion is a guiding post. The guiding post can extend into the guiding hole, that is, when the first housing and the second housing are assembled, the guiding post extends into the guiding hole, to play the role of guiding the assembling of the first housing and the second housing, and this avoids the situation of the misplacement of the first housing and the second housing, and provides an effective and reliable structural support for the effectiveness and the feasibility of enclosing the sealing cavity.

In any of the above embodiments, furthermore, the cover plate assembly is further provided with a limiting part, the limiting part is located in the sealing cavity, and the limiting part is configured to limit the displacement of the lead in the sealing cavity.

In this embodiment, the cover plate assembly is further provided with the limiting part, so that the limiting part is located in the sealing cavity, and the limiting part is configured to limit the displacement of the lead in the sealing cavity, which prevents the occurrence of the displacement of the lead, can ensure the relative position relation of the lead and the first passage portion, and further provides an effective and reliable structural support for the wiring portion to subsequently extend into the sealing cavity to be electrically connected to the lead.

In any of the above embodiments, furthermore, the limiting part comprises a limiting groove and/or a limiting hole.

In this embodiment, the limiting part comprises the limiting groove and/or the liming hole, and the limiting groove and/or the limiting hole can limit the displacement of the lead in the sealing cavity.

In some embodiments, the outer wall surface of the lead is provided with a limiting bump, the limiting bump can be inserted into the limiting groove, or the limiting bump can be inserted into the limiting hole. The number of the limiting bumps is multiple, a portion of the multiple limiting bumps are in cooperative connection with the limiting groove, and the other portion of the multiple limiting bumps are in cooperative connection with the limiting groove.

In any of the above embodiments, furthermore, the number of the limiting parts is multiple.

In this embodiment, the number of the limiting parts is multiple, and the multiple limiting parts enlarge the limiting area of the cover plate assembly for limiting the movement of the lead, which is beneficial to improve the stability and feasibility of the cover plate assembly in fixing and limiting the lead.

In any of the above embodiments, furthermore, the numbers of the sealing cavities, the first passage portions and the second passage portions are all multiple, and each sealing cavity is in communication with one first passage portion and one second passage portion.

In this embodiment, through reasonably disposing the cooperating structures of the multiple sealing cavities, the multiple first passage portions and the multiple second passage portions, each sealing cavity is in communication with one first passage portion and one second passage portion. The electric motor comprises a plurality of leads, and each lead extends into one sealing cavity through the second passage portions. This arrangement can ensure the relative independence of the plurality of the leads.

In any of the above embodiments, furthermore, the cover plate assembly is further disposed with an identification portion, and the identification portion is located at the second passage portion.

In this embodiment, through disposing the identification portion, the identification portion is located at the second passage portion, and the identification portion has the function of identifying the types of leads in the sealing cavities, and thus helps operators assemble and disassemble the electric motor.

In some embodiments, the numbers of the leads, the sealing cavities and the identification portions are respectively three, and the three identification portions are respectively "U", "V" and "W".

In any of the above embodiments, furthermore, the cover plate assembly is an insulated cover plate assembly.

The second aspect of the present disclosure proposes a stator, including the cover plate assembly in any of the embodiments according to the first aspect.

The stator proposed in the present disclosure comprises the cover plate assembly according to any of the embodiments in the first aspect, and thus has all the beneficial effects of the above cover plate assembly, which are not repeated herein.

In the above embodiment, furthermore, the stator further comprises a lead, and a portion of the lead extends into the sealing cavity through the second passage portion.

In this embodiment, the stator comprises the lead, the lead of the stator extends into the sealing cavity through the second passage portion, and the wiring portion of the device which is in cooperative connection with the electric motor is inserted into the sealing cavity through the second passage portion to be electrically connected to the lead.

In any of the above embodiments, furthermore, the lead comprises: a conducting wire; a sleeve, put around the outer side of the conducting wire; and a terminal, located at one side of the sleeve, and the terminal is connected to the conducting wire, the terminal is provided with a bump, and the bump is in cooperative connection with the limiting part of the cover plate assembly.

In this embodiment, the lead comprises the conducting wire, the sleeve and the terminal, and the sleeve is put around the outer side of the conducting wire, and the terminal is located at one side of the sleeve and is electrically connected to the conducting wire, and the lead is electrically connected to the wiring portion of other devices through the terminal.

Furthermore, the terminal is provided with a bump, the limiting part is in cooperative connection with the bump, to limit the displacement of the lead in the sealing cavity, and avoid the occurrence of the displacing of the lead, and this can ensure the relative position relation between the lead and the first passage portion, and further provides an effective and reliable structural support for the wiring portion to subsequently extend into the sealing cavity to be electrically connected to the lead.

The third aspect of the present disclosure proposes an electric motor, including the stator in any of the embodiments according to the second aspect.

The electric motor proposed by the present disclosure comprises the stator in any of the embodiments according to the second aspect, and thus has all the beneficial effects of the above stator, which are not repeated herein.

The fourth aspect of the present disclosure proposes a compressor, including the electric motor in any of the embodiments according to the third aspect.

The compressor proposed in the present disclosure comprises the electric motor in any of the embodiments according to the third aspect, and thus has all the beneficial effects of the above electric motor, which are not repeated herein.

In the above embodiment, furthermore, the compressor comprises a wiring portion, the wiring portion extends into the sealing cavity of the electric motor through the first passage portion of the electric motor, and is electrically connected to the lead; and the wiring portion is in interference fit with the first passage portion.

In this embodiment, the compressor comprises the wiring portion, the wiring portion is in interference fit with the first passage portion, so that the wall surface of the first passage portion is closely attached to the outer surface of the wiring portion, to achieve the sealing effect.

The first passage portion, the second passage portion and the sealing cavity cooperate with one another to achieve the multiple sealing effect, to effectively prevent the media such as oil and refrigerant from penetrating into the cover plate assembly.

The fifth aspect of the present disclosure proposes a vehicle, including the compressor according to the fourth aspect.

The vehicle proposed by the present disclosure comprises the compressor according to the fourth aspect, and thus has all the beneficial effects of the above compressor, which are not repeated herein.

The additional aspects and advantages of the present disclosure will be obvious in the following description, or can be understood through the implementation of the present disclosure.

BRIEF DESCRIPTION OF THE DRAWINGS

The above and/or additional aspects and advantages of the present disclosure will be obvious and understood easily from the following description of the embodiments in combination with the accompanying drawings. And, FIG. 1 shows a schematic view of the structure of a cover plate assembly from a first angle of view according to an embodiment of the present disclosure.

Figure 1:
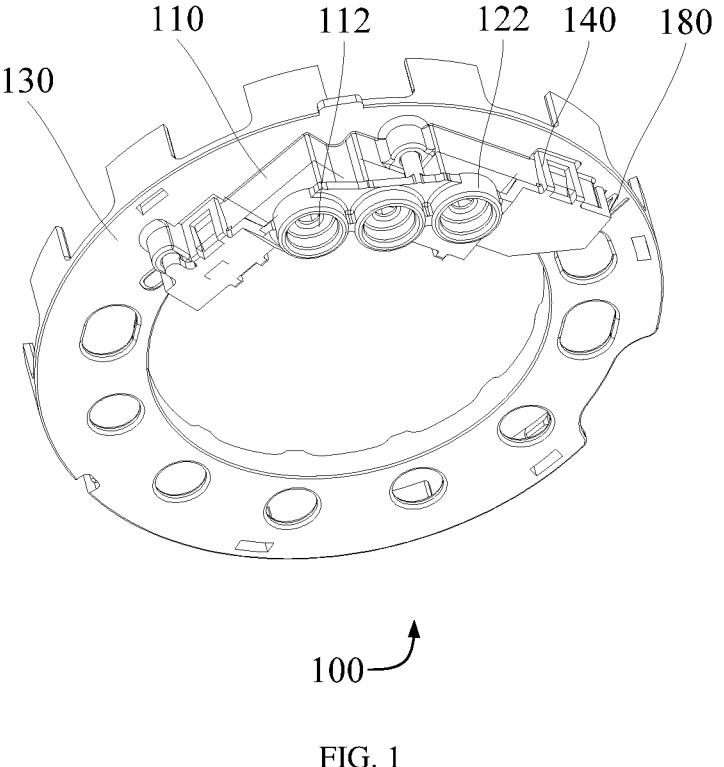
Figure 2:
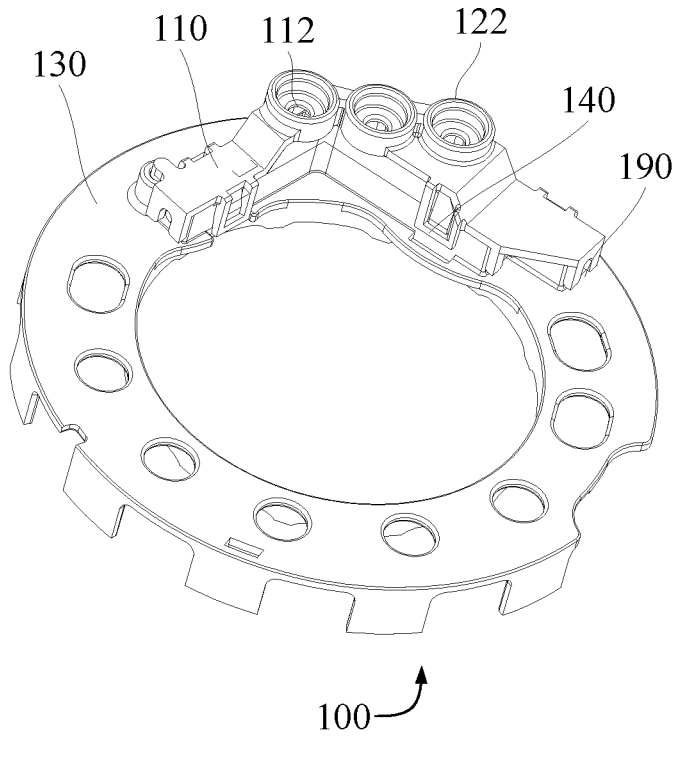
FIG. 2 shows a schematic view of the structure of the cover plate assembly from a second angle of view according to an embodiment of the present disclosure.
Figure 3:
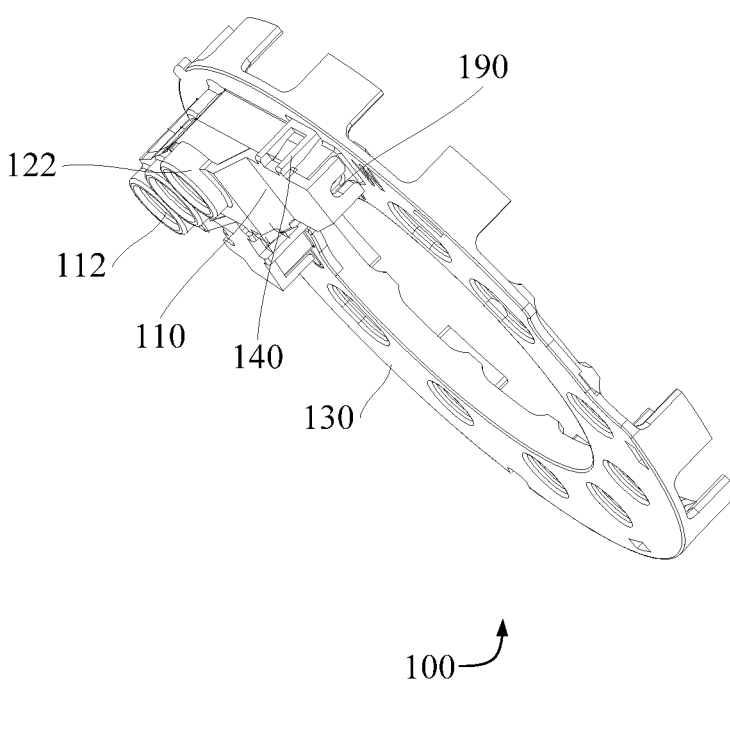
FIG. 3 shows a schematic view of the structure of the cover plate assembly from a third angle of view according to an embodiment of the present disclosure.
Figure 4:
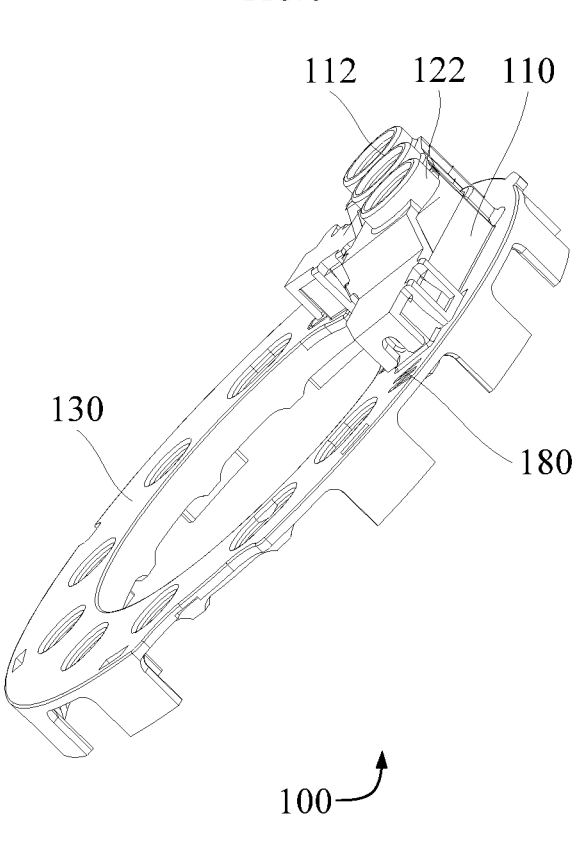
FIG. 4 shows a schematic view of the structure of the cover plate assembly from a fourth angle of view according to an embodiment of the present disclosure.
Figure 5:
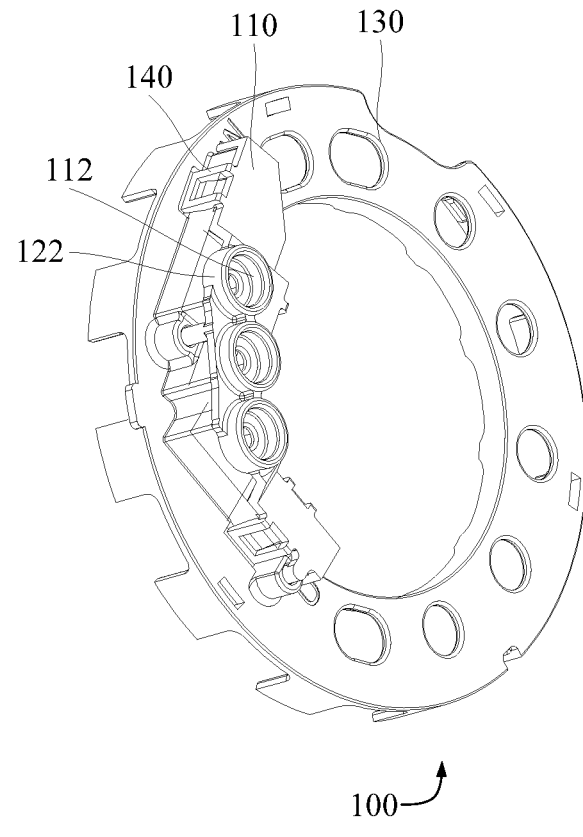
FIG. 5 shows a schematic view of the structure of the cover plate assembly from a fifth angle of view according to an embodiment of the present disclosure.
Figure 6:
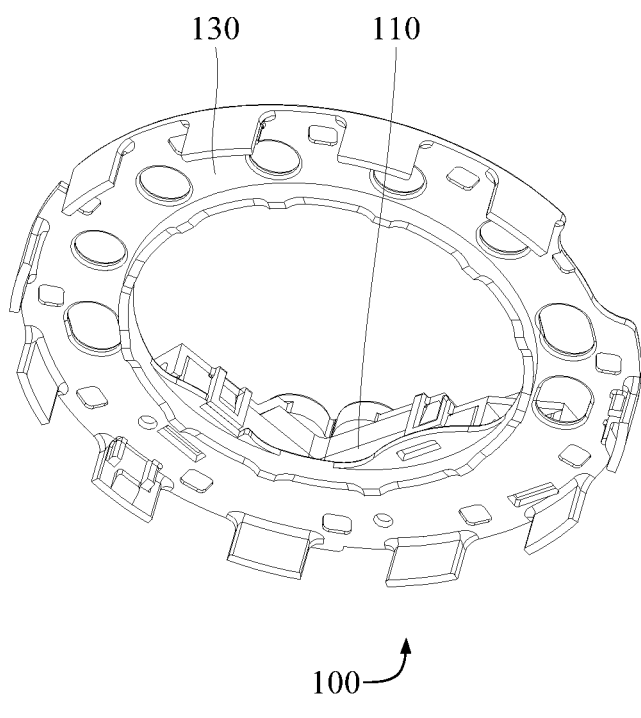
FIG. 6 shows a schematic view of the structure of the cover plate assembly from a sixth angle of view according to an embodiment of the present disclosure.
Figures 7, 8:
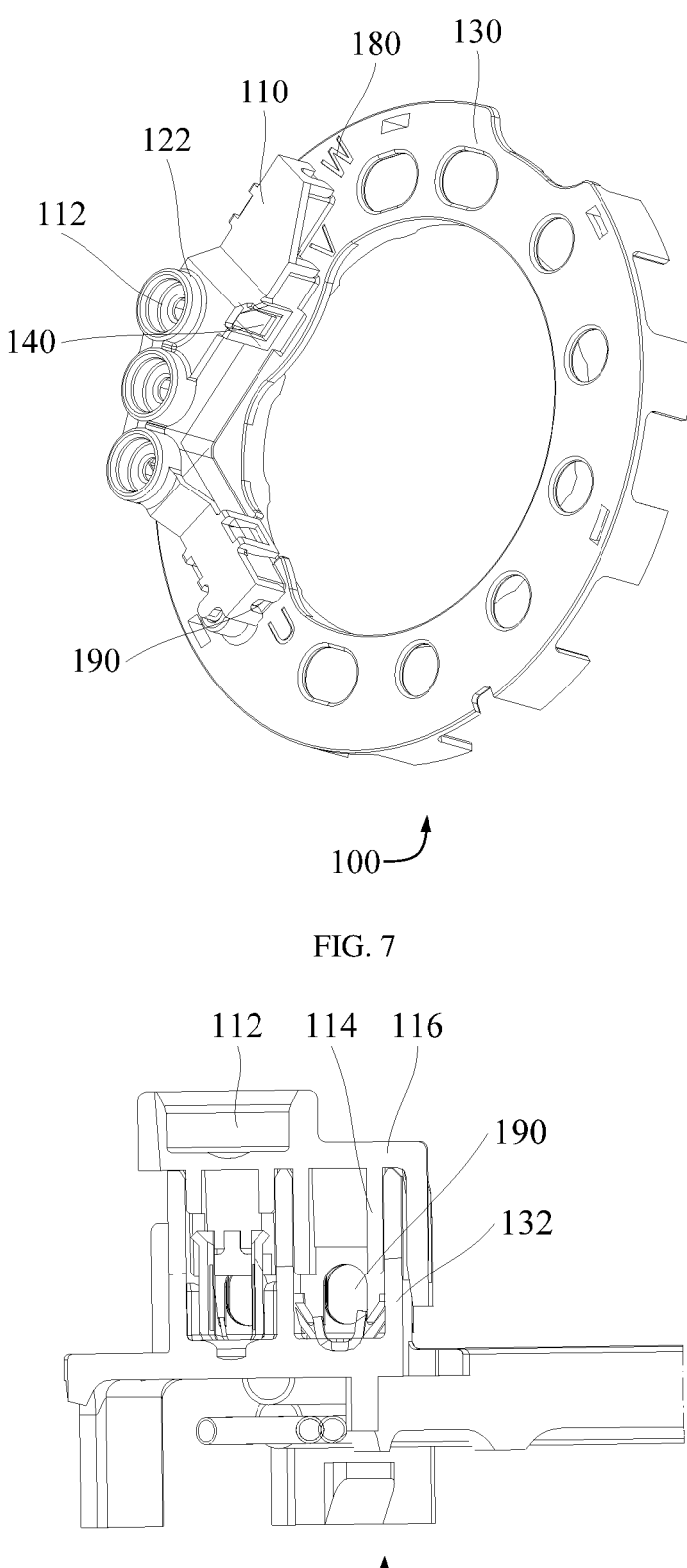
FIG. 7 shows a schematic view of the structure of the cover plate assembly from a seventh angle of view according to an embodiment of the present disclosure.
FIG. 8 shows a schematic view of a portion of the structure of a cover plate assembly according to an embodiment of the present disclosure.
Figure 9:
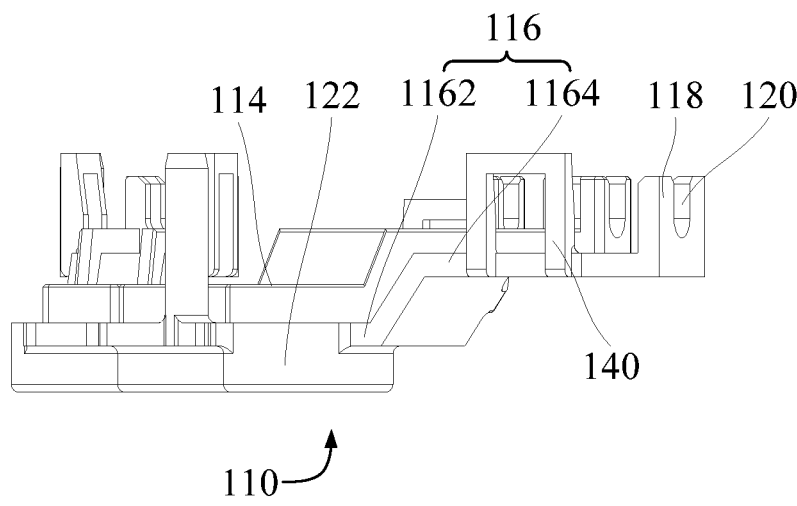
FIG. 9 shows a schematic view of the structure of a first housing from a first angle of view according to an embodiment of the present disclosure.
Figure 10:
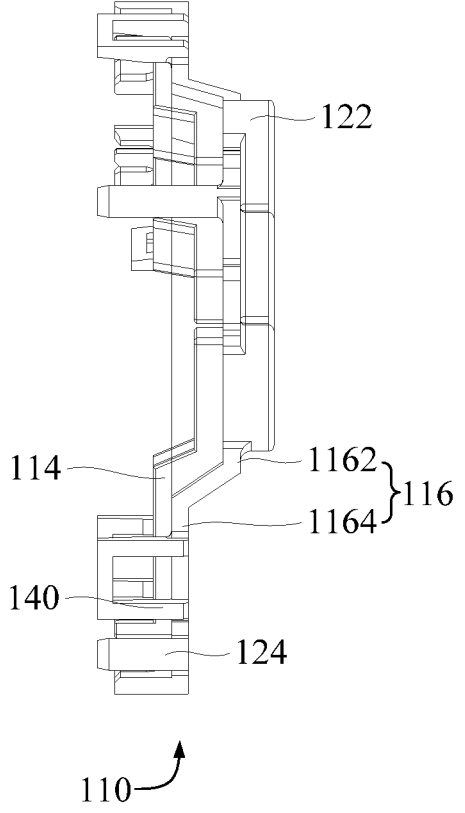
FIG. 10 shows a schematic view of the structure of the first housing from a second angle of view according to an embodiment of the present disclosure.
Figure 11:
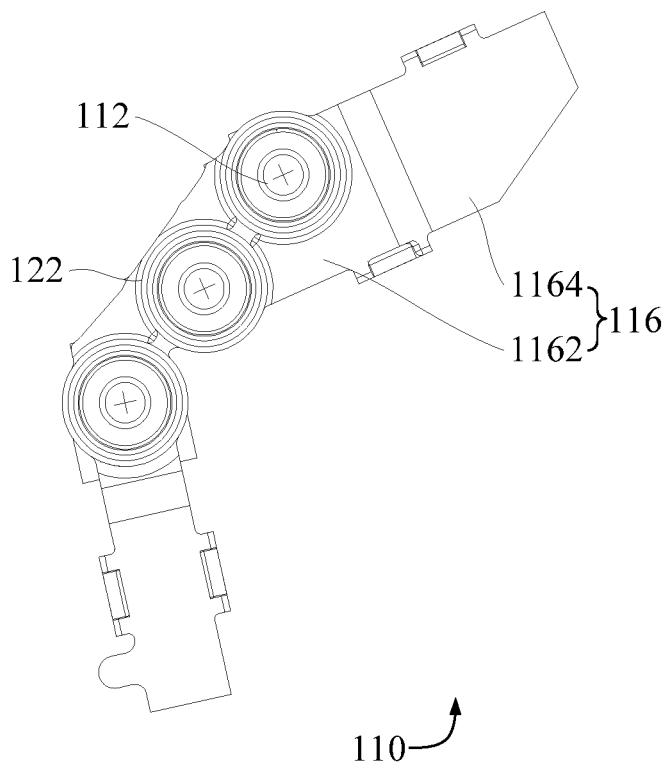
FIG. 11 shows a schematic view of the structure of the first housing from a third angle of view according to an embodiment of the present disclosure.
Figure 12:
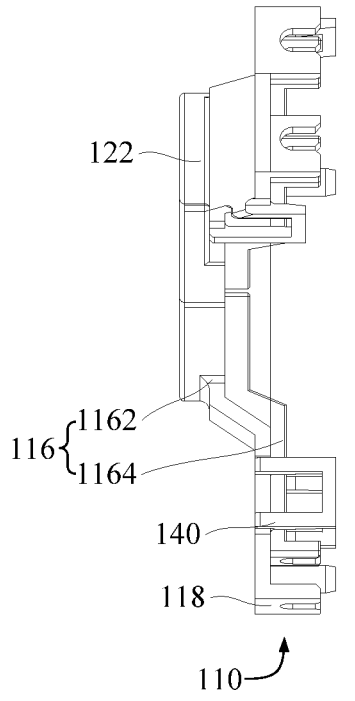
FIG. 12 shows a schematic view of the structure of the first housing from a fourth angle of view according to an embodiment of the present disclosure.
Figure 13:
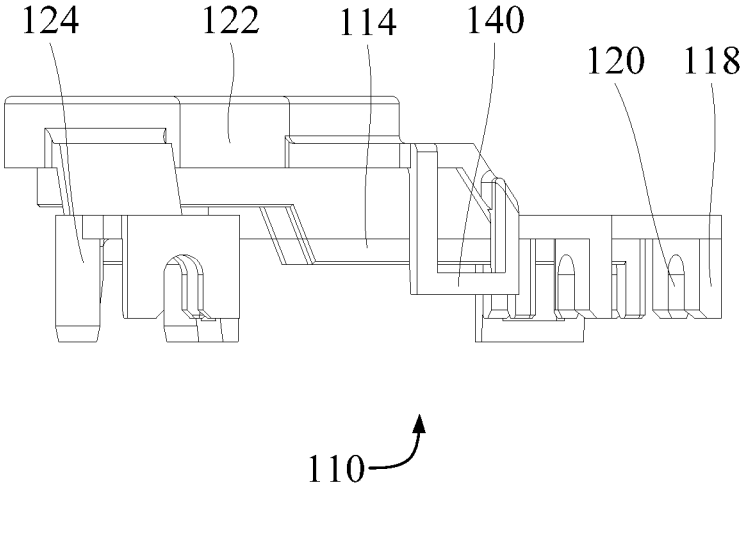
FIG. 13 shows a schematic view of the structure of the first housing from a fifth angle of view according to an embodiment of the present disclosure.
Figure 14:
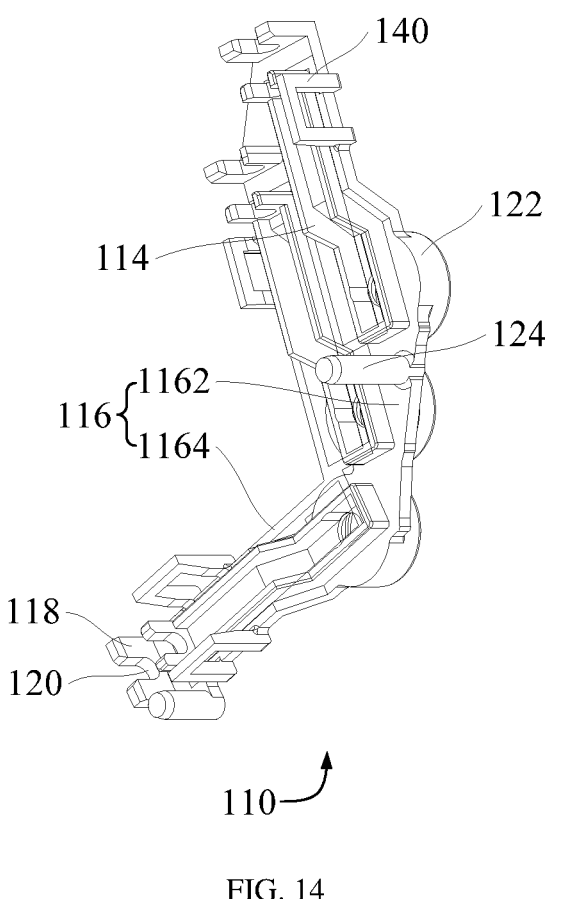
FIG. 14 shows a schematic view of the structure of the first housing from a sixth angle of view according to an embodiment of the present disclosure.

The corresponding relationships between the reference signs and the component names in FIGS. 1-24 are as follows:

100: cover plate assembly, 110: first housing, 112: first passage portion, 114: first mounting groove, 116: mounting plate, 1162: first plate body, 1164: second plate body, 118: first baffle, 120: first concave portion, 122: convex portion, 124: first guiding portion, 130: second housing, 132: second mounting groove; 134: second baffle, 136: second concave portion, 138: second guiding portion, 140: first connecting portion, 150: second connecting portion, 160: first limiting part, 170: second limiting part, 180: identification portion, 190: second passage portion, 200: lead, 202: conducting wire, 204: sleeve, 206: terminal, 208: first bump, 210: second bump, 300: compressor, and 302: wiring portion.

DETAILED DESCRIPTION OF THE DISCLOSURE

In order to understand the above-mentioned objectives, features and advantages of the present disclosure more clearly, a further detailed description of the embodiments of the present disclosure will be given below in combination with the accompanying drawings and embodiments. It should be noted that the embodiments of the present disclosure and the features in the embodiments can be combined with each other if there is no conflict.

In the following description, numerous details are set forth in order to provide a thorough understanding of the present disclosure. However, the present disclosure can further be implemented in other manners than those described herein. Therefore, the protection scope of the embodiments of the present disclosure is not limited to the embodiments disclosed below.

A cover plate assembly 100, a stator, an electric motor, a compressor 300 and a vehicle proposed by some embodiments of the present disclosure are described below with reference to FIGS. 1-24.

As shown in FIGS. 1-8 and 23, an embodiment of the first aspect of the present disclosure proposes a cover plate assembly 100 used for an electric motor, and the electric motor comprises a lead 200, and the cover plate assembly 100 comprises a first housing 110 and a second housing 130.

The first housing 110 is provided with a first passage portion 112; and the second housing 130 is detachably connected to the first housing 110, and a sealing cavity and a second passage portion 190 are enclosed between the first housing 110 and the second housing 130.

The first passage portion 112 and the second passage portion 190 are both in communication with the sealing cavity; and the second passage portion 190 is used for the lead 200 to extend into the sealing cavity.

In some embodiments, the cover plate assembly 100 comprises the first housing 110 and the second housing 130, and the sealing cavity and the second passage portion 190 are enclosed between the first housing 110 and the second housing 130, and the first housing 110 is provided with the first passage portion 112, and the first passage portion 112 and the second passage portion 190 are both in communication with the sealing cavity. The lead 200 of the electric motor extends into the sealing cavity through the second passage portion 190, and the wiring portion 302 of a device in cooperative connection with the electric motor is inserted into the sealing cavity through the second passage portion 190 to be electrically connected to the lead 200. In some embodiments, the first housing 110 is a receptacle, and the second housing 130 is an insulating end cover.

Since the connection between the lead 200 and the wiring portion 302 is located inside the sealing cavity, the sealing cavity can effectively prevent external media such as oil and refrigerant from penetrating into the connection between the lead 200 and the wiring portion 302, and then has an excellent sealing effect, and the situation where the insulation resistance of the stator of the electric motor drops sharply due to the penetration of the media such as oil and refrigerant into the connection between the lead 200 and the wiring portion 302 is avoided, which is beneficial to ensure the use performance and reliability of the electric motor.

It can be understood that the cover plate assembly 100 is used in cooperation with the insulating support of the electric motor, and the cover plate assembly 100 has a function of fixing and limiting the lead 200, and this can ensure the cooperating dimension of the device connected to the lead 200 and the electric motor, to avoid the occurrence of the situation where the displacement of the lead 200 disconnects the lead 200 from the wiring portion 302, and provides an effective structural support for the stability and the reliability of the use of products. In addition, the first housing 110 cooperates with the second housing 130 so that the connection between the lead 200 and the wiring portion 302 is located inside the sealing cavity, and this arrangement can prevent an external force from directly acting on the lead 200 and the wiring portion 302, and thus has a protection function and is beneficial to extend the service life of the products.

Furthermore, the first housing 110 is detachably connected to the second housing 130, which helps the disassembly and assembly of the lead 200 with respect to the cover plate assembly 100, and has the advantage of low production cost; in addition, the arrangement is convenient for the cleaning and maintenance of the cover plate assembly 100.

In some embodiments, the cover plate assembly 100 is an insulated cover plate assembly.

As shown in FIGS. 1-8 and 23, a cover plate assembly 100 used for an electric motor, according to another embodiment based on the previous embodiment, is provided. The electric motor comprises a lead 200, and the cover plate assembly 100 comprises a first housing 110 and a second housing 130.

The first housing 110 is provided with a first passage portion 112; and the second housing 130 is detachably connected to the first housing 110, and a sealing cavity and a second passage portion 190 are enclosed between the first housing 110 and the second housing 130.

The first passage portion 112 and the second passage portion 190 are both in communication with the sealing cavity; and the second passage portion 190 is used for the lead 200 to extend into the sealing cavity.

Furthermore, as shown in FIGS. 8-10 and 13-16, a portion of the first housing 110 protrudes to form a first mounting groove 114; a portion of the second housing 130 protrudes to form a second mounting groove 132, the first mounting groove 114 extends into the second mounting groove 132, and the sealing cavity is enclosed between the inner wall surface of the second mounting groove 132 and the inner wall surface of the first mounting groove 114; and the protruding direction of the first mounting groove 114 is opposite to the protruding direction of the second mounting groove 132.

In some embodiments, the first housing 110 is formed with the first mounting groove 114, the second housing 130 is formed with the second mounting groove 132, when the first housing 110 is in cooperative connection with the second housing 130, the first mounting groove 114 of the first housing 110 extends into the second mounting groove 132, to use the inner wall surface of the first mounting groove 114 and the inner wall surface of the second mounting groove 132 to enclose the sealing cavity for accommodating the lead 200.

The protruding direction of the first mounting groove 114 is opposite to the protruding direction of the second mounting groove 132, i.e., the first mounting groove 114 is in snap-fit connection with the second mounting groove 132, the inner wall surface of the first mounting groove 114 cooperates with the inner wall surface of the second mounting groove 132 to achieve an effective protection function, and even if the media such as oil and refrigerant penetrate into the cover plate assembly 100, the outer wall surface of the second mounting groove 132 can further have a function of blocking the media, to ensure the sealing effect of the sealing cavity.

In some embodiments, the outer wall surface of the first mounting groove 114 leans against the inner wall surface of the second mounting groove 132, to improve the sealing performance of the sealing cavity.

As shown in FIGS. 1-8 and 23, a cover plate assembly 100 used for an electric motor is provided, according to another embodiment based on the previous embodiments. The electric motor comprises a lead 200, and the cover plate assembly 100 comprises a first housing 110 and a second housing 130.

The first housing 110 is provided with a first passage portion 112; and the second housing 130 is detachably connected to the first housing 110, and a sealing cavity and a second passage portion 190 are enclosed between the first housing 110 and the second housing 130.

The first passage portion 112 and the second passage portion 190 are both in communication with the sealing cavity; and the second passage portion 190 is used for the lead 200 to extend into the sealing cavity.

A portion of the first housing 110 protrudes to form a first mounting groove 114; a portion of the second housing 130 protrudes to form a second mounting groove 132, the first mounting groove 114 extends into the second mounting groove 132, and the sealing cavity is enclosed between the inner wall surface of the second mounting groove 132 and the inner wall surface of the first mounting groove 114; and the protruding direction of the first mounting groove 114 is opposite to the protruding direction of the second mounting groove 132.

Furthermore, as shown in FIGS. 9-12 and 14, the first housing 110 comprises a mounting plate 116, the first mounting groove 114 is located at one side of the mounting plate 116, a portion of the mounting plate 116 protrudes out of the side portion of the first mounting groove 114, and the top wall of the second mounting groove 132 abuts on the portion of the mounting plate 116 which protrudes out of the side portion of the first mounting groove 114.

In some embodiments, through reasonably disposing the cooperating structure of the first housing 110 and the second housing 130, the first housing 110 comprises the mounting plate 116, and the first mounting groove 114 is located at one side of the mounting plate 116; after the first housing 110 and the second housing 130 are assembled, the top wall of the second mounting groove 132 abuts on the portion of the mounting plate 116 which protrudes out of the side portion of the first mounting groove 114. The top wall of the second mounting groove 132 is in cooperative connection with the mounting plate 116 to achieve the sealing effect, and thus, even if the media such as oil and refrigerant penetrate into the cover plate assembly 100 and the cumulative height of the media is relatively large, the media can still be blocked outside the sealing cavity by the top wall of second mounting groove 132 and the mounting plate 116 which abut on each other, to achieve a good sealing effect.

In some embodiments, the top wall of the second mounting groove 132 is in surface contact with the portion of the mounting plate 116 which protrudes out of the side portion of the first mounting groove 114, and this arrangement enlarges the cooperating area and the cooperating angle between the first housing 110 and the second housing 130, achieves sealing at multiple angles, and helps improve the effectiveness and feasibility of the sealing of the cover plate assembly 100.

In some embodiments, the top wall of the second mounting groove 132 comprises any of or the combination of a plane, a curved surface and a folded surface.

As shown in FIGS. 1-8 and 23, a cover plate assembly 100 used for an electric motor is provided, according to another embodiment based on the previous embodiments. The electric motor comprises a lead 200, and the cover plate assembly 100 comprises a first housing 110 and a second housing 130.

The first housing 110 is provided with a first passage portion 112; and the second housing 130 is detachably connected to the first housing 110, and a sealing cavity and a second passage portion 190 are enclosed between the first housing 110 and the second housing 130.

The first passage portion 112 and the second passage portion 190 are both in communication with the sealing cavity; and the second passage portion 190 is used for the lead 200 to extend into the sealing cavity.

A portion of the first housing 110 protrudes to form a first mounting groove 114; a portion of the second housing 130 protrudes to form a second mounting groove 132, the first mounting groove 114 extends into the second mounting groove 132, and the sealing cavity is enclosed between the inner wall surface of the second mounting groove 132 and the inner wall surface of the first mounting groove 114; and the protruding direction of the first mounting groove 114 is opposite to the protruding direction of the second mounting groove 132.

The first housing 110 comprises a mounting plate 116, the first mounting groove 114 is located at one side of the mounting plate 116, a portion of the mounting plate 116 protrudes out of the side portion of the first mounting groove 114, and the top wall of the second mounting groove 132 abuts on the portion of the mounting plate 116 which protrudes out of the side portion of the first mounting groove 114.

Furthermore, as shown in FIGS. 9 and 12-16, the first housing 110 is provided with a first baffle 118, the first baffle 118 and the first mounting groove 114 are located at the same side of the mounting plate 116, the first baffle 118 is provided with the first concave portion 120, and the first concave portion 120 is in communication with the first mounting groove 114.

The second housing 130 is provided with a second baffle 134, the second baffle 134 is provided with a second concave portion 136 at the portion corresponding to the first concave portion 120, the second concave portion 136 is in communication with the second mounting groove 132.

The concaving direction of the first concave portion 120 is opposite to that of the second concave portion 136, and the second passage portion 190 is enclosed by the first concave portion 120 and the second concave portion 136.

In some embodiments, the first housing 110 is provided with the first baffle 118, the second housing 130 is provided with the second baffle 134, the first concave portion 120 is provided in the first baffle 118, the second concave portion 136 is provided in the second baffle 134, and the concaving direction of the first concave portion 120 is opposite to that of the second concave portion 136; the wall surface of the first concave portion 120 and the wall surface of the second concave portion 136 are both in cooperative connection with the outer peripheral wall of the lead 200. That is, the first concave portion 120 cooperates with the second concave portion 136 to allow the lead 200 to extend into the sealing cavity.

The first baffle 118 cooperates with the second baffle 134 to achieve multiple sealing functions, which is beneficial to improve the sealing effect of the cover plate assembly 100 to the lead 200. In addition, the concaving direction of the first concave portion 120 is opposite to that of the second concave portion 136, that is, the first concave portion 120 cooperates with the second concave portion 136 to support and fix the lead 200.

In some embodiments, the mounting plate 116 constitutes the bottom wall of the first mounting groove 114, the first mounting groove 114 comprises a first wall and a second wall, both the first wall and the second wall are located at one side of the mounting plate 116, and both the first wall and the second wall are connected to the mounting plate 116.

Furthermore, the first concave portion 120 cooperates with the second concave portion 136 to compress the lead 200 located inside the second passage portion 190.

The lead 200 comprises a conducting wire 202, a sleeve 204 and a terminal 206, the conducting wire 202 is electrically connected to the terminal 206, the sleeve 204 is put around the outer side of the conducting wire 202, and the sleeve 204 is located at one side of the terminal 206. The first concave portion 120 cooperates with the second concave portion 136 to compress the lead 200 located inside the passage portion, the sleeve 204 is deformed due to stress, and thus, the outer wall surface of the sleeve 204 is closely attached to the first concave portion 120 and the second concave portion 136, to achieve the sealing effect. That is, the second passage portion 190 is in interference fit with the lead 200.

Since the concaving direction of the first concave portion 120 is opposite to that of the second concave portion 136, the lead 200 can be compressed from multiple directions and multiple angles, to effectively prevent the media such as oil and refrigerant from penetrating into the cover plate assembly 100.

The second passage portion 190 cooperates with the sealing cavity to achieve a multiple sealing effect, which is beneficial to improve the sealing effect of the cover plate assembly 100 to the connection between the lead 200 and the wiring portion 302.

As shown in FIGS. 1-8 and 23, a cover plate assembly 100 used for an electric motor is provided, according to another embodiment based on the previous embodiments. The electric motor comprises a lead 200, and the cover plate assembly 100 comprises a first housing 110 and a second housing 130.

The first housing 110 is provided with a first passage portion 112; and the second housing 130 is detachably connected to the first housing 110, and a sealing cavity and a second passage portion 190 are enclosed between the first housing 110 and the second housing 130.

The first passage portion 112 and the second passage portion 190 are both in communication with the sealing cavity; and the second passage portion 190 is used for the lead 200 to extend into the sealing cavity.

A portion of the first housing 110 protrudes to form a first mounting groove 114; a portion of the second housing 130 protrudes to form a second mounting groove 132, the first mounting groove 114 extends into the second mounting groove 132, and the sealing cavity is enclosed between the inner wall surface of the second mounting groove 132 and the inner wall surface of the first mounting groove 114; and the protruding direction of the first mounting groove 114 is opposite to the protruding direction of the second mounting groove 132.

The first housing 110 comprises a mounting plate 116, the first mounting groove 114 is located at one side of the mounting plate 116, a portion of the mounting plate 116 protrudes out of the side portion of the first mounting groove 114, and the top wall of the second mounting groove 132 abuts on the portion of the mounting plate 116 which protrudes out of the side portion of the first mounting groove 114.

The first housing 110 is provided with a first baffle 118, the first baffle 118 and the first mounting groove 114 are located at the same side of the mounting plate 116, the first baffle 118 is provided with the first concave portion 120, and the first concave portion 120 is in communication with the first mounting groove 114.

The second housing 130 is provided with a second baffle 134, the second baffle 134 is provided with a second concave portion 136 at the portion corresponding to the first concave portion 120, the second concave portion 136 is in communication with the second mounting groove 132.

The concaving direction of the first concave portion 120 is opposite to that of the second concave portion 136, and the second passage portion 190 is enclosed by the first concave portion 120 and the second concave portion 136.

Furthermore, the number of the second baffles 134 is multiple; the multiple second baffles 134 are arranged alternatively along the direction from the second baffles 134 to the first baffle 118.

In some embodiments, the number of the second baffles 134 is multiple, through reasonably disposing the cooperating structure of the multiple second baffles 134, the multiple second baffles 134 are arranged alternatively along the direction from the second baffles 134 to the first baffle 118, and this arrangement enlarges the cooperating area between the second passage portion 190 and the lead 200, to ensure the supporting and fixing effect of the second passage portion 190 to the lead 200.

In addition, the multiple second baffles 134 are arranged alternatively, and this arrangement is equivalent to defining a plurality of concave structures, if the media such as oil and refrigerant penetrate into the cover plate assembly 100, they need to cross the plurality of concave structures one by one, that is, this arrangement achieves multiple sealing.

In some embodiments, the second mounting groove 132 comprises a third wall and a fourth wall, the third wall and the fourth wall are opposite to each other and arranged alternatively, the second baffle 134 which is located at the outermost side is connected to both the third wall and the fourth wall, that is, the second baffle 134 at the outermost side constitutes the side wall of the second mounting groove 132 at one side, and the remaining second baffles 134 are all located inside the second mounting groove 132.

Furthermore, the number of the first baffles 118 is two, and the multiple second baffles 134 are all located between the two first baffles 118.

The number of the first baffles 118 is two, one of the two first baffles 118 is located at one side of the multiple second baffles 134, and the other of the two first baffles 118 is located at the other side of the multiple second baffles 134, the two first baffles 118 cooperates with the multiple second baffles 134, and this arrangement is equivalent to defining a plurality of concave structures, if the media such as oil and refrigerant penetrate into the cover plate assembly 100, they need to cross the plurality of concave structures one by one, that is, this arrangement achieves multiple sealing.

In some embodiments, one of the two first baffles 118 extends into the second mounting groove 132, and the other of the two first baffles 118 is located at the outer side of the second mounting groove 132.

As shown in FIGS. 1-8 and 23, a cover plate assembly 100 used for an electric motor is provided, according to another embodiment based on the previous embodiments. The electric motor comprises a lead 200, and the cover plate assembly 100 comprises a first housing 110 and a second housing 130.

The first housing 110 is provided with a first passage portion 112; and the second housing 130 is detachably connected to the first housing 110, and a sealing cavity and a second passage portion 190 are enclosed between the first housing 110 and the second housing 130.

The first passage portion 112 and the second passage portion 190 are both in communication with the sealing cavity; and the second passage portion 190 is used for the lead 200 to extend into the sealing cavity.

A portion of the first housing 110 protrudes to form a first mounting groove 114; a portion of the second housing 130 protrudes to form a second mounting groove 132, the first mounting groove 114 extends into the second mounting groove 132, and the sealing cavity is enclosed between the inner wall surface of the second mounting groove 132 and the inner wall surface of the first mounting groove 114; and the protruding direction of the first mounting groove 114 is opposite to the protruding direction of the second mounting groove 132.

The first housing 110 comprises a mounting plate 116, the first mounting groove 114 is located at one side of the mounting plate 116, a portion of the mounting plate 116 protrudes out of the side portion of the first mounting groove 114, and the top wall of the second mounting groove 132 abuts on the portion of the mounting plate 116 which protrudes out of the side portion of the first mounting groove 114.

Furthermore, as shown in FIGS. 1-5, 7 and 10-14, the first housing 110 further comprises a convex portion 122, the convex portion 122 is connected to the mounting plate 116, the convex portion 122 and the first mounting groove 114 are located at the two opposite sides of the mounting plate 116, the first passage portion 112 is a through-hole, and the through-hole penetrates through the convex portion 122 and the bottom wall of the first mounting groove 114.

In some embodiments, the first housing 110 further comprises the convex portion 122, the convex portion 122 is located at one side of the mounting plate 116, and the first mounting groove 114 is located at the other side of the mounting plate 116; the first passage portion 112 is a through-hole, and the through-hole penetrates through the convex portion 122 and the bottom wall of the first mounting groove 114. That is, the first passage portion 112 extends from the sealing cavity towards the direction departing from the sealing cavity, and thus, the media such as oil and refrigerant outside the cover plate assembly 100 need to cross the convex portion 122 to enter into the first passage portion 112, and this arrangement is beneficial to improve the sealing effect of the cover plate assembly 100.

The first passage portion 112 is the through-hole, the through-hole can penetrate through the convex portion 122 and the bottom wall of the first mounting groove 114, and thus, the wiring portion 302 of the device which is electrically connected to the electric motor is inserted into the through-hole from top to bottom, and enters the sealing cavity to be electrically connected to the lead 200 in the sealing cavity.

In some embodiments, the lead 200 comprises a cooperating surface, the cooperating surface is disposed corresponding to the through-hole, and thus, the wiring portion 302 is inserted into the through-hole and electrically connected to the cooperating surface of the lead 200.

Furthermore, as shown in FIGS. 9-12 and 14, the mounting plate 116 comprises a first plate body 1162 and a second plate body 1164 from the convex portion 122 to the edge of the first housing 110; the first plate body 1162 is located above the second plate body 1164 in the direction from the first housing 110 to the second housing 130; and the convex portion 122 is connected to the first plate body 1162.

The mounting plate 116 comprises the first plate body 1162 and the second plate body 1164, and the second plate body 1164 is located at one side of the first plate body 1162; the first plate body 1162 is located above the second plate body 1164 in the direction from the first housing 110 to the second housing 130, and the convex portion 122 is connected to the first plate body 1162 located at a higher position, and thus, the media such as oil and refrigerant outside the cover plate assembly 100 need to sequentially cross the first plate body 1162 and the convex portion 122 to enter into the first passage portion 112, and this arrangement is beneficial to improve the sealing effect of the cover plate assembly 100.

Furthermore, along the direction from the first housing 110 to the second housing 130, the portion of the bottom wall of the second mounting groove 132 corresponding to the through-hole is located above the portion of the bottom wall of the second mounting groove 132 corresponding to the second passage portion 190.

Through reasonably disposing the structure of the second mounting groove 132, the bottom wall of the second mounting groove 132 comprises the portion corresponding to the through-hole and the portion corresponding to the second passage portion 190, and the portion of the bottom wall of the second mounting groove 132 corresponding to the through-hole is located above the portion of the bottom wall of the second mounting groove 132 corresponding to the second passage portion 190. That is, the portion of the lead 200 used for electrical connection with the wiring portion 302 is located at a higher position, and thus, even if the media such as oil and refrigerant penetrate into the cover plate assembly 100, they will flow to the connection between the lead 200 and the wiring portion 302 only when the cumulative height of the media such as oil and refrigerant reaches a certain value. This arrangement can effectively avoid the occurrence of the situation where the insulation resistance of the stator of the electric motor drops sharply, which is beneficial to ensure the use performance and reliability of the electric motor.

As shown in FIGS. 1-8 and 23, a cover plate assembly 100 used for an electric motor is provided, according to another embodiment based on the previous embodiments. The electric motor comprises a lead 200, and the cover plate assembly 100 comprises a first housing 110 and a second housing 130.

The first housing 110 is provided with a first passage portion 112; and the second housing 130 is detachably connected to the first housing 110, and a sealing cavity and a second passage portion 190 are enclosed between the first housing 110 and the second housing 130.

The first passage portion 112 and the second passage portion 190 are both in communication with the sealing cavity; and the second passage portion 190 is used for the lead 200 to extend into the sealing cavity.

A portion of the first housing 110 protrudes to form a first mounting groove 114; a portion of the second housing 130 protrudes to form a second mounting groove 132, the first mounting groove 114 extends into the second mounting groove 132, and the sealing cavity is enclosed between the inner wall surface of the second mounting groove 132 and the inner wall surface of the first mounting groove 114; and the protruding direction of the first mounting groove 114 is opposite to the protruding direction of the second mounting groove 132.

Furthermore, as shown in FIGS. 1-3, 5, 7, 9, 10 and 12-15, the cover plate assembly 100 further comprises a first connecting portion 140 and a second connecting portion 150; the first connecting portion 140 is provided in the first housing 110; the second connecting portion 150 is provided in the second housing 130, and the first housing 110 is detachably connected to the second housing 130 through the first connecting portion 140 and the second connecting portion 150.

In some embodiments, the cover plate assembly 100 further comprises the first connecting portion 140 and the second connecting portion 150, and the first connecting portion 140 is provided in the first housing 110, the second connecting portion 150 is provided in the second housing 130, and the first connecting portion 140 is detachably connected to the second connecting portion 150, to further achieve the purpose that the first housing 110 is detachably connected to the second housing 130. This arrangement can ensure the cooperating dimension of the first housing 110 and the second housing 130, and provides an effective structural support for the effectiveness and feasibility of enclosing the sealing cavity between the first housing 110 and the second housing 130.

It can be understood that the first housing 110 is detachably connected to the second housing 130 through the first connecting portion 140 and the second connecting portion 150, to achieve enclosing the sealing cavity between the first housing 110 and the second housing 130. When the cover plate assembly 100 needs to be disassembled, the binding force between the first housing 110 and the second housing 130 can be removed through applying an external force to the first housing 110 and/or the second housing 130, to further achieve the purpose of separating the first housing 110 from the second housing 130. This structural arrangement has assembly reliability, helps the assembly and subsequent disassembly and maintenance, and is convenient for the adjustment and calibration of a displacing housing with respect to the second housing 130 in the assembling process.

In the present embodiment, one of the first connecting portion 140 and the second connecting portion 150 is a buckle, the other one is a buckling position portion, and the buckle is in buckling cooperation with the buckling position portion.

Another connecting method of the first housing 110 and the second housing 130 is in some embodiments defined; the first housing 110 is in buckling connection with the second housing 130, and one of the first connecting portion 140 and the second connecting portion 150 is a buckle, the other one is a buckling position portion, and in some embodiments, the first housing 110 is provided with the buckling position portion, the second housing 130 is provided with the buckle; or the second housing 130 is provided with the buckling position portion, and the first housing 110 is provided with the buckle. It is beneficial to the rapid disassembling and assembling of the first housing 110 and the second housing 130.

In some other embodiments, both the first connecting portion 140 and the second connecting portion 150 are threaded holes, the cover plate assembly 100 further comprises a threaded component, and the threaded component is in threaded connection and cooperation with the threaded holes.

Another connecting method of the first housing 110 and the second housing 130 is in some embodiments defined. The first housing 110 is connected to the second housing 130 through the threaded component. It is convenient for rapid disassembling of the first housing 110 and the second housing 130 while the stability of the connection between the first housing 110 and the second housing 130 is ensured.

In some embodiments, it is in some embodiments defined that the threaded component comprises a screw, both the first housing 110 and the second housing 130 are disposed with the threaded holes, and the screw is in threaded connection with the threaded holes. By using the screw connecting, it is convenient for assembling, saves costs, simplifies the production technology, improves the production efficiency and further helps the subsequent disassembling and maintenance.

In some other embodiments, one of the first connecting portion 140 and the second connecting portion 150 is a limiting rib, the other one is a limiting socket, and the limiting rib can be inserted into the limiting socket.

It is defined that the first housing 110 can be connected to the second housing 130 through the cooperation method of the limiting socket and the limiting rib. By in some embodiments disposing the limiting rib and the limiting socket which cooperate with each other, the first housing 110 is in inserting connection with the second housing 130. It is convenient for assembling and is beneficial to the rapid disassembling and assembling of the first housing 110 and the second housing 130, and helps the first housing 110 rapidly find the position of the limiting socket to be assembled on the second housing 130.

Figure 15:
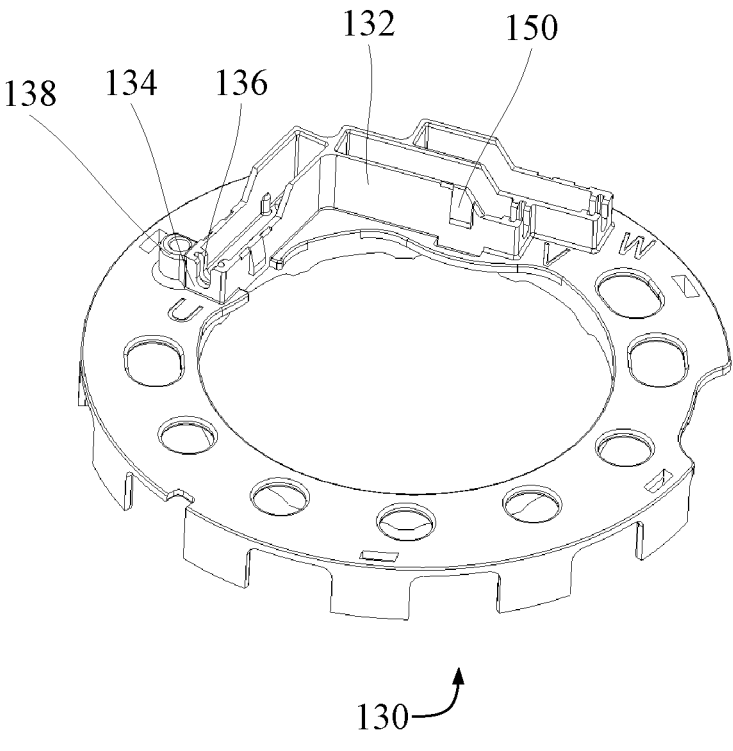
FIG. 15 shows a schematic view of the structure of a second housing from a first angle of view according to an embodiment of the present disclosure.
Figure 22:
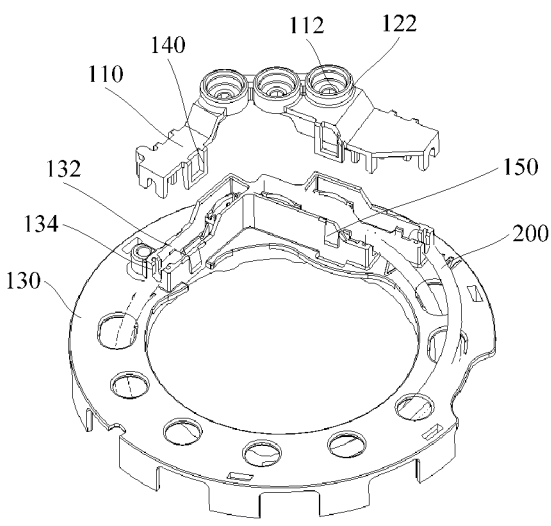
FIG. 22 shows an exploded view of a cover plate assembly and a lead according to an embodiment of the present disclosure.

Furthermore, as shown in FIGS. 15 and 22, the second connecting portion 150 is provided on the outer wall surface of the second mounting groove 132, and the portion of the first housing 110 corresponding to the second connecting portion 150 is provided with the first connecting portion 140.

Through reasonably disposing the position relation between the first connecting portion 140 and the second connecting portion 150, the outer wall surface of the second mounting groove 132 is provided with the second connecting portion 150, the first housing 110 is provided with the first connecting portion 140, and the first connecting portion 140 is disposed corresponding to the second connecting portion 150. Thus, after the first housing 110 and the second housing 130 are assembled, the first connecting portion 140 on the first housing 110 is in cooperative connection with the second connecting portion 150 which is provided on the outer wall surface of the second mounting groove 132.

In some embodiments, the numbers of the sealing cavities, the first connecting portions 140 and the second connecting portions 150 are all multiple, at least one second connecting portion 150 is provided on the outer wall surface of each second mounting groove 132, and each second connecting portion 150 is detachably connected to one of the first connecting portions 140. That is, there are N sealing cavities, and then there are N cooperative connections of the first housing 110 and the second housing 130.

As shown in FIGS. 1-8 and 23, a cover plate assembly 100 used for an electric motor is provided, according to another embodiment based on the previous embodiments. The electric motor comprises a lead 200, and the cover plate assembly 100 comprises a first housing 110 and a second housing 130.

The first housing 110 is provided with a first passage portion 112; and the second housing 130 is detachably connected to the first housing 110, and a sealing cavity and a second passage portion 190 are enclosed between the first housing 110 and the second housing 130.

The first passage portion 112 and the second passage portion 190 are both in communication with the sealing cavity; and the second passage portion 190 is used for the lead 200 to extend into the sealing cavity.

Furthermore, as shown in FIGS. 10 and 13-15, the first housing 110 is provided with a first guiding portion 124, the second housing 130 is provided with a second guiding portion 138, and the first guiding portion 124 is in cooperative connection with the second guiding portion 138.

In some embodiments, through reasonably disposing the cooperating structure of the first housing 110 and the second housing 130, the first housing 110 is provided with the first guiding portion 124, the second housing 130 is provided with the second guiding portion 138, the first guiding portion 124 and the second guiding portion 138 have the aim of guiding the cooperative connection between the first housing 110 and the second housing 130, so that the cooperating dimension of the first housing 110 and the second housing 130 is effectively ensured, and the effectiveness of the formed sealing cavity is ensured. This arrangement simplifies the assembling process of the first housing 110 and the second housing 130, reduces the assembling difficulty of the first housing 110 and the second housing 130, and helps improve the rapid disassembly and assembly of the first housing 110 and the second housing 130.

Furthermore, one of the first guiding portion 124 and the second guiding portion 138 is a guiding post, the other one is a guiding hole, and the guiding post can extend into the guiding hole.

Through reasonably disposing the cooperating structure of the first guiding portion 124 and the second guiding portion 138, the first guiding portion 124 is a guiding post, and the second guiding portion 138 is a guiding hole; or the first guiding portion 124 is a guiding hole, and the second guiding portion 138 is a guiding post. The guiding post can extend into the guiding hole, that is, when the first housing 110 and the second housing 130 are assembled, the guiding post extends into the guiding hole, to play the role of guiding the assembling of the first housing 110 and the second housing 130, and this avoids the situation of the misplacement of the first housing 110 and the second housing 130, and provides an effective and reliable structural support for the effectiveness and the feasibility of enclosing the sealing cavity.

As shown in FIGS. 1-8 and 23, a cover plate assembly 100 used for an electric motor is provided, according to another embodiment based on the previous embodiments. The electric motor comprises a lead 200, and the cover plate assembly 100 comprises a first housing 110 and a second housing 130.

The first housing 110 is provided with a first passage portion 112; and the second housing 130 is detachably connected to the first housing 110, and a sealing cavity and a second passage portion 190 are enclosed between the first housing 110 and the second housing 130.

The first passage portion 112 and the second passage portion 190 are both in communication with the sealing cavity; and the second passage portion 190 is used for the lead 200 to extend into the sealing cavity.

Figure 16:
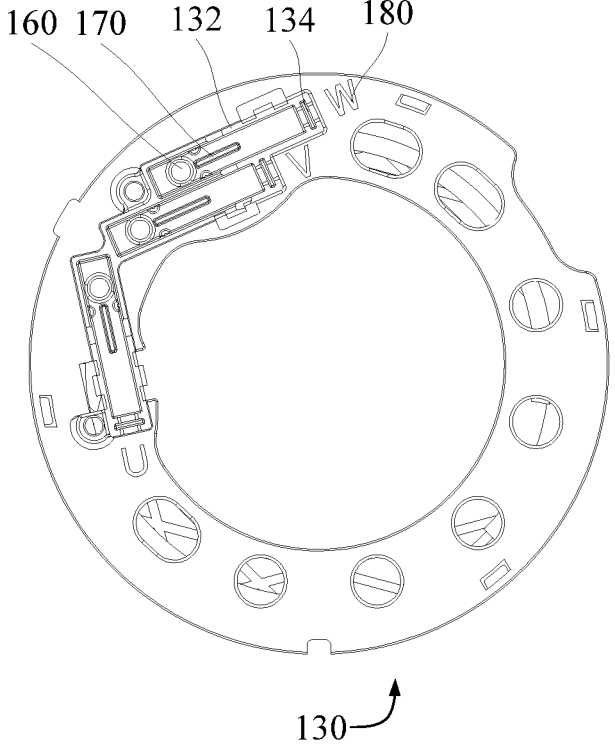
FIG. 16 shows a schematic view of the structure of the second housing from a second angle of view according to an embodiment of the present disclosure.
Figure 17:
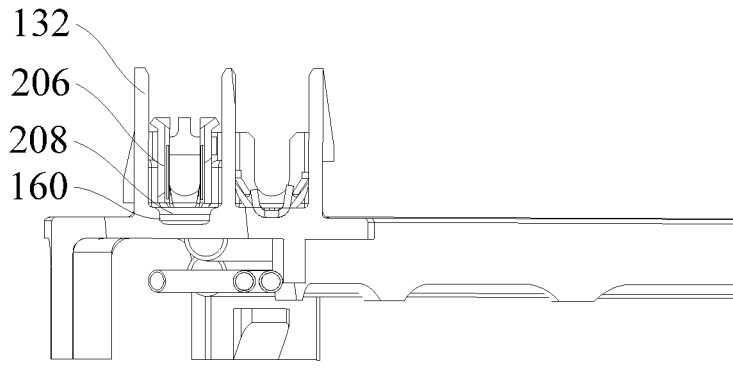
FIG. 17 shows a schematic view of the structure of a second housing and the terminal of a lead according to an embodiment of the present disclosure.
Figure 18:
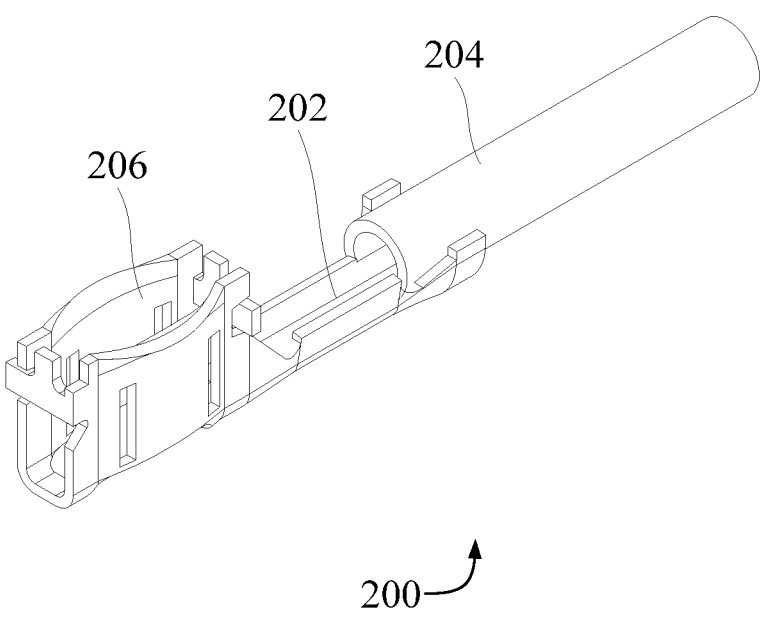
FIG. 18 shows a schematic view of the structure of a lead from a first angle of view according to an embodiment of the present disclosure.
Figure 19:
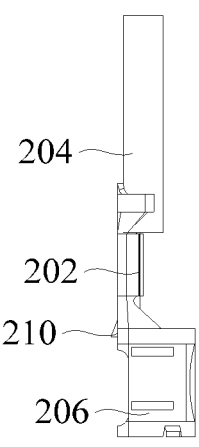
FIG. 19 shows a schematic view of the structure of the lead from a second angle of view according to an embodiment of the present disclosure.
Figure 20:
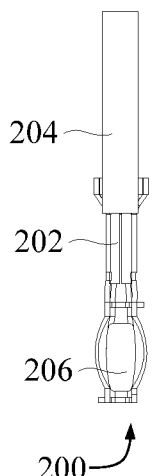
FIG. 20 shows a schematic view of the structure of the lead from a third angle of view according to an embodiment of the present disclosure.
Figure 21:
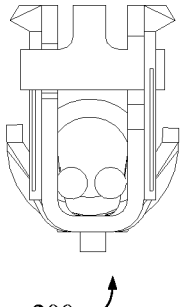
FIG. 21 shows a schematic view of the structure of the lead from a fourth angle of view according to an embodiment of the present disclosure.

Furthermore, as shown in FIGS. 16, 17 and 19, the cover plate assembly 100 is further provided with a limiting part, the limiting part is located in the sealing cavity, and the limiting part is configured to limit the displacement of the lead 200 in the sealing cavity.

In some embodiments, the cover plate assembly 100 is further provided with the limiting part, so that the limiting part is located in the sealing cavity, and the limiting part is configured to limit the displacement of the lead 200 in the sealing cavity, which prevents the occurrence of the displacement of the lead 200, and can ensure the relative position relation of the lead 200 and the first passage portion 112, and further provides an effective and reliable structural support for the wiring portion 302 to subsequently extend into the sealing cavity to be electrically connected to the lead 200.

Furthermore, the limiting part comprises: a limiting groove and/or a limiting hole.

The limiting part comprises the limiting groove and/or the liming hole, and the limiting groove and/or the limiting hole can limit the displacement of the lead 200 in the sealing cavity.

In some embodiments, the number of the limiting parts is two, which are respectively indicated as a first limiting part 160 and a second limiting part 170; the number of the bumps is two, which are respectively indicated as a first bump 208 and a second bump 210.

As shown in FIG. 17, a portion of the terminal 206 of the lead 200 forms the first bump 208; as shown in FIGS. 16 and 17, the first limiting part 160 is a groove, and the first bump 208 can be inserted into the first limiting part 160.

As shown in FIG. 19, the outer wall surface of the terminal 206 of the lead 200 is provided with the second bump 210; as shown in FIG. 16, the second limiting part 170 is a strip-type groove, and the second bump 210 can extend into the second limiting groove.

Furthermore, the number of the limiting parts is multiple.

The number of the limiting parts is multiple, and the multiple limiting parts enlarge the limiting area of the cover plate assembly 100 for limiting the movement of the lead 200, which is beneficial to improve the stability and feasibility of the cover plate assembly 100 in fixing and limiting the lead 200.

In the present embodiment, the structures of the multiple limiting parts are different from one another.

In some other embodiments, a portion of the multiple limiting parts have the same structure, while the other portion of the multiple limiting parts have different structures.

In some other embodiments, all of the structures of multiple limiting parts are the same.

As shown in FIGS. 1-8 and 23, a cover plate assembly 100 used for an electric motor is provided, according to another embodiment based on the previous embodiments. The electric motor comprises a lead 200, and the cover plate assembly 100 comprises a first housing 110 and a second housing 130.

The first housing 110 is provided with a first passage portion 112; and the second housing 130 is detachably connected to the first housing 110, and a sealing cavity and a second passage portion 190 are enclosed between the first housing 110 and the second housing 130.

The first passage portion 112 and the second passage portion 190 are both in communication with the sealing cavity; and the second passage portion 190 is used for the lead 200 to extend into the sealing cavity.

Furthermore, as shown in FIGS. 16, 17 and 19, the numbers of the sealing cavities, the first passage portions 112 and the second passage portions 190 are all multiple, and each sealing cavity is in communication with one first passage portion 112 and one second passage portion 190.

In some embodiments, through reasonably disposing the cooperating structures of the multiple sealing cavities, the multiple first passage portions 112 and the multiple second passage portions 190, each sealing cavity is in communication with one first passage portion 112 and one second passage portion 190. The electric motor comprises a plurality of leads 200, and each lead 200 extends into one sealing cavity through the second passage portions 190. This arrangement can ensure the relative independence of the plurality of the leads 200.

As shown in FIGS. 1-8 and 23, a cover plate assembly 100 used for an electric motor is provided, according to another embodiment based on the previous embodiments. The electric motor comprises a lead 200, and the cover plate assembly 100 comprises a first housing 110 and a second housing 130.

The first housing 110 is provided with a first passage portion 112; and the second housing 130 is detachably connected to the first housing 110, and a sealing cavity and a second passage portion 190 are enclosed between the first housing 110 and the second housing 130.

The first passage portion 112 and the second passage portion 190 are both in communication with the sealing cavity; and the second passage portion 190 is used for the lead 200 to extend into the sealing cavity.

Furthermore, as shown in FIGS. 1, 4, 7 and 16, the cover plate assembly 100 is further disposed with an identification portion 180, and the identification portion 180 is located at the second passage portion 190.

In some embodiments, through disposing the identification portion 180, the identification portion 180 is located at the second passage portion 190, and the identification portion 180 has the function of identifying the types of leads 200 in the sealing cavities, and thus helps operators assemble and disassemble the electric motor.

In some embodiments, the numbers of the leads 200, the sealing cavities and the identification portions 180 are respectively three, and the three identification portions 180 are respectively "U", "V" and "W".

The embodiment according to the second aspect of the present disclosure proposes a stator, including the cover plate assembly 100 in any of the embodiments according to the first aspect.

The stator comprises a cover plate assembly 100.

The cover plate assembly 100 comprises a first housing 110 and a second housing 130. A sealing cavity and a second passage portion 190 are enclosed between the first housing 110 and the second housing 130, the first housing 110 is provided with a first passage portion 112; and the first passage portion 112 and the second passage portion 190 are both in communication with the sealing cavity. The lead 200 of the electric motor extends into the sealing cavity through the second passage portion 190, and the wiring portion 302 of the device which is in cooperative connection with the electric motor is inserted into the sealing cavity through the second passage portion 190 to be electrically connected to the lead 200. In some embodiments, the first housing 110 is a receptacle, and the second housing 130 is an insulating end cover.

Since the connection between the lead 200 and the wiring portion 302 is located inside the sealing cavity, the sealing cavity can effectively prevent external media such as oil and refrigerant from penetrating into the connection between the lead 200 and the wiring portion 302, and then has an excellent sealing effect, and the situation where the insulation resistance of the stator of the electric motor drops sharply due to the penetration of the media such as oil and refrigerant into the connection between the lead 200 and the wiring portion 302 is avoided, which is beneficial to ensure the use performance and reliability of the electric motor.

It can be understood that the cover plate assembly 100 is used in cooperation with the insulating support of the electric motor, and the cover plate assembly 100 has a function of fixing and limiting the lead 200, and this can ensure the cooperating dimension of the device connected to the lead 200 and the electric motor, to avoid the occurrence of the situation where the displacement of the lead 200 disconnects the lead 200 from the wiring portion 302, and provides an effective structural support for the stability and the reliability of the use of products. In addition, the first housing 110 cooperates with the second housing 130 so that the connection between the lead 200 and the wiring portion 302 is located inside the sealing cavity, and this arrangement can prevent an external force from directly acting on the lead 200 and the wiring portion 302, and thus has a protection function and is beneficial to extend the service life of the products.

A stator is provided according to another embodiment. The stator comprises a cover plate assembly 100, the stator further comprises a lead 200, and a portion of the lead 200 extends into the sealing cavity through the second passage portion 190.

In some embodiments, the stator comprises the lead 200, the lead 200 of the stator extends into the sealing cavity through the second passage portion 190, and the wiring portion 302 of the device which is in cooperative connection with the electric motor is inserted into the sealing cavity through the second passage portion 190 to be electrically connected to the lead 200.

Furthermore, as shown in FIGS. 17-21, the lead 200 comprises a conducting wire 202, a sleeve 204 and a terminal 206, and the sleeve 204 is put around the outer side of the conducting wire 202, and the terminal 206 is located at one side of the sleeve 204 and is electrically connected to the conducting wire 202, the terminal 206 is provided with a bump, and the bump is in cooperative connection with the limiting part of the cover plate assembly 100.

The lead 200 comprises the conducting wire 202, the sleeve 204 and the terminal 206, and the sleeve 204 is put around the outer side of the conducting wire 202, and the terminal 206 is located at one side of the sleeve 204 and is electrically connected to the conducting wire 202, and the lead 200 is electrically connected to the wiring portion 302 of other devices through the terminal 206.

In addition, the terminal 206 is provided with a bump, the limiting part is in cooperative connection with the bump, to limit the displacement of the lead 200 in the sealing cavity, and avoid the occurrence of the displacing of the lead 200, and this can ensure the relative position relation between the lead 200 and the first passage portion 112, and further provides an effective and reliable structural support for the wiring portion 302 to subsequently extend into the sealing cavity to be electrically connected to the lead 200.

In some embodiments, the number of the limiting parts is two, which are respectively indicated as a first limiting part 160 and a second limiting part 170; the number of the bumps is two, which are respectively indicated as a first bump 208 and a second bump 210.

As shown in FIG. 17, a portion of the terminal 206 of the lead 200 forms the first bump 208; as shown in FIGS. 16 and 17, the first limiting part 160 is a groove, and the first bump 208 can be inserted into the first limiting part 160.

As shown in FIG. 19, the outer wall surface of the terminal 206 of the lead 200 is provided with the second bump 210; as shown in FIG. 16, the second limiting part 170 is a strip-type groove, and the second bump 210 can extend into the second limiting groove.

In some embodiments, the electric motor comprises an insulating framework, and the second housing 130 of the cover plate assembly 100 is provided to cover the insulating framework.

The embodiment according to the third aspect of the present disclosure proposes an electric motor, including the stator in the second aspect.

The electric motor comprises the stator, and the stator comprises a cover plate assembly 100.

The cover plate assembly 100 comprises a first housing 110 and a second housing 130. A sealing cavity and a second passage portion 190 are enclosed between the first housing 110 and the second housing 130; the first housing 110 is provided with a first passage portion 112; and the first passage portion 112 and the second passage portion 190 are both in communication with the sealing cavity. The lead 200 of the electric motor extends into the sealing cavity through the second passage portion 190, and the wiring portion 302 of the device which is in cooperative connection with the electric motor is inserted into the sealing cavity through the second passage portion 190 to be electrically connected to the lead 200. In some embodiments, the first housing 110 is a receptacle, and the second housing 130 is an insulating end cover.

Since the connection between the lead 200 and the wiring portion 302 is located inside the sealing cavity, the sealing cavity can effectively prevent external media such as oil and refrigerant from penetrating into the connection between the lead 200 and the wiring portion 302, and then has an excellent sealing effect, and the situation where the insulation resistance of the stator of the electric motor drops sharply due to the penetration of the media such as oil and refrigerant into the connection between the lead 200 and the wiring portion 302 is avoided, which is beneficial to ensure the use performance and reliability of the electric motor.

It can be understood that the cover plate assembly 100 is used in cooperation with the insulating support of the electric motor, and the cover plate assembly 100 has a function of fixing and limiting the lead 200, and this can ensure the cooperating dimension of the device connected to the lead 200 and the electric motor, to avoid the occurrence of the situation where the displacement of the lead 200 disconnects the lead 200 from the wiring portion 302, and provides an effective structural support for the stability and the reliability of the use of products. In addition, the first housing 110 cooperates with the second housing 130 so that the connection between the lead 200 and the wiring portion 302 is located inside the sealing cavity, and this arrangement can prevent an external force from directly acting on the lead 200 and the wiring portion 302, and thus has a protection function and is beneficial to extend the service life of the products.

Figure 23:
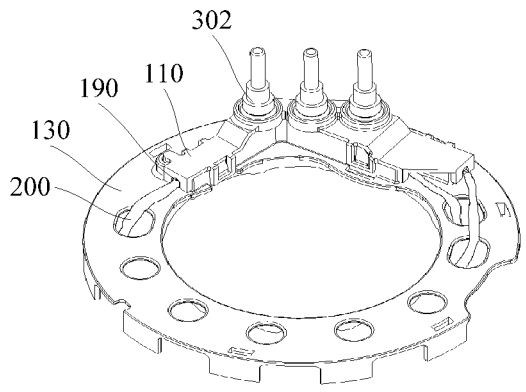
FIG. 23 shows a schematic view of the structure of a cover plate assembly, a lead and a wiring portion according to an embodiment of the present disclosure.
Figure 24:
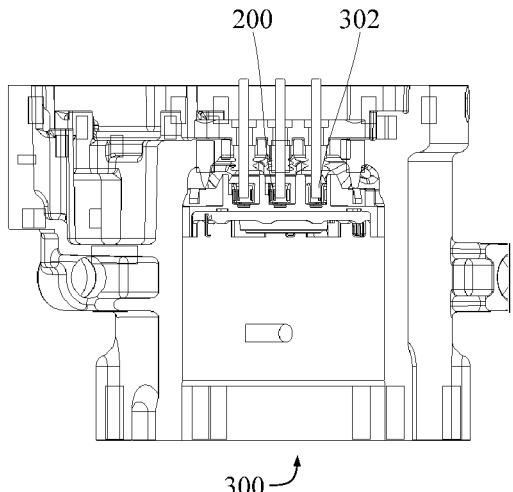
FIG. 24 shows a schematic view of a portion of the structure of a compressor according to an embodiment of the present disclosure.

As shown in FIGS. 23 and 24, the embodiment according to the fourth aspect of the present disclosure proposes a compressor 300, including the electric motor in the third aspect.

The compressor 300 comprises the electric motor, the electric motor comprises a stator, and the stator comprises a cover plate assembly 100.

The cover plate assembly 100 comprises a first housing 110 and a second housing 130. A sealing cavity and a second passage portion 190 are enclosed between the first housing 110 and the second housing 130; the first housing 110 is provided with a first passage portion 112; and the first passage portion 112 and the second passage portion 190 are both in communication with the sealing cavity. The lead 200 of the electric motor extends into the sealing cavity through the second passage portion 190, and the wiring portion 302 of the device which is in cooperative connection with the electric motor is inserted into the sealing cavity through the second passage portion 190 to be electrically connected to the lead 200. In some embodiments, the first housing 110 is a receptacle, and the second housing 130 is an insulating end cover.

Since the connection between the lead 200 and the wiring portion 302 is located inside the sealing cavity, the sealing cavity can effectively prevent external media such as oil and refrigerant from penetrating into the connection between the lead 200 and the wiring portion 302, and thus has an excellent sealing effect, and the situation where the insulation resistance of the stator of the electric motor drops sharply due to the penetration of the media such as oil and refrigerant into the connection between the lead 200 and the wiring portion 302 is avoided, which is beneficial to ensure the use performance and reliability of the electric motor.

It can be understood that the cover plate assembly 100 is used in cooperation with the insulating support of the electric motor, and the cover plate assembly 100 has a function of fixing and limiting the lead 200, and this can ensure the cooperating dimension of the device connected to the lead 200 and the electric motor, to avoid the occurrence of the situation where the displacement of the lead 200 disconnects the lead 200 from the wiring portion 302, and provides an effective structural support for the stability and the reliability of the use of products. In addition, the first housing 110 cooperates with the second housing 130 so that the connection between the lead 200 and the wiring portion 302 is located inside the sealing cavity, and this arrangement can prevent an external force from directly acting on the lead 200 and the wiring portion 302, and thus has a protection function and is beneficial to extend the service life of the products.

Furthermore, as shown in FIGS. 23 and 24, the compressor 300 comprises a wiring portion 302, the wiring portion 302 extends into the sealing cavity of the electric motor through the first passage portion 112 of the electric motor, and is electrically connected to the lead 200; and the wiring portion 302 is in interference fit with the first passage portion 112.

The compressor 300 comprises the wiring portion 302, the wiring portion 302 is in interference fit with the first passage portion 112, so that the wall surface of the first passage portion 112 is closely attached to the outer surface of the wiring portion 302, to achieve the sealing effect.

The first passage portion 112, the second passage portion 190 and the sealing cavity cooperate with one another to achieve a multiple sealing effect, to effectively prevent the media such as oil and refrigerant from penetrating into the cover plate assembly 100.

The embodiment according to the fifth aspect of the present disclosure proposes a vehicle, including the compressor 300 in the fourth aspect.

The vehicle comprises the compressor 300, the compressor 300 comprises an electric motor, the electric motor comprises a stator, and the stator comprises a cover plate assembly 100.

The cover plate assembly 100 comprises a first housing 110 and a second housing 130. A sealing cavity and a second passage portion 190 are enclosed between the first housing 110 and the second housing 130; the first housing 110 is provided with a first passage portion 112; and the first passage portion 112 and the second passage portion 190 are both in communication with the sealing cavity. The lead 200 of the electric motor extends into the sealing cavity through the second passage portion 190, and the wiring portion 302 of the device which is in cooperative connection with the electric motor is inserted into the sealing cavity through the second passage portion 190 to be electrically connected to the lead 200. In some embodiments, the first housing 110 is a receptacle, and the second housing 130 is an insulating end cover.

Since the connection between the lead 200 and the wiring portion 302 is located inside the sealing cavity, the sealing cavity can effectively prevent external media such as oil and refrigerant from penetrating into the connection between the lead 200 and the wiring portion 302, and then has an excellent sealing effect, and the situation where the insulation resistance of the stator of the electric motor drops sharply due to the penetration of the media such as oil and refrigerant into the connection between the lead 200 and the wiring portion 302 is avoided, which is beneficial to ensure the use performance and reliability of the electric motor.

It can be understood that the cover plate assembly 100 is used in cooperation with the insulating support of the electric motor, and the cover plate assembly 100 has a function of fixing and limiting the lead 200, and this can ensure the cooperating dimension of the device connected to the lead 200 and the electric motor, to avoid the occurrence of the situation where the displacement of the lead 200 disconnects the lead 200 from the wiring portion 302, and provides an effective structural support for the stability and the reliability of the use of products. In addition, the first housing 110 cooperates with the second housing 130 so that the connection between the lead 200 and the wiring portion 302 is located inside the sealing cavity, and this arrangement can prevent an external force from directly acting on the lead 200 and the wiring portion 302, and thus has a protection function and is beneficial to extend the service life of the products.

The cover plate assembly 100 comprises a first housing 110 and a second housing 130, and the first housing 110 is a receptacle, and the second housing 130 is an insulating end plate.

The terminal 206 of the lead 200 is placed inside the sealing cavity composed of the insulating end plate and the receptacle; the insulating end plate is fixed at one side of the iron core of a stator, and the receptacle is fixed on the upper portion of the insulating end plate.

The insulating end plate comprises three second mounting grooves 132 for fixing the terminal 206 of a three-phase lead 200.

A second baffle 134 is provided at one side of the three second mounting grooves 132 of the insulating end plate, a U-shaped concave portion is provided in the second baffle 134, for passing the terminal 206 of the lead 200 and the sleeve 204.

A second connecting portion 150 (in an embodiment, a buckling position portion) is provided on the outer wall of the three second mounting groove 132 of the insulating end plate, for locking with the receptacle.

Three first mounting grooves 114 are provided at the lower side of the receptacle, for cooperating with the three second mounting grooves 132 of the insulating end plate.

A ring-shaped convex portion 122 is provided on the upper side of the receptacle, for cooperating with the rubber sealing ring of the compressor 300.

A first connecting portion 140 (in an embodiment, a buckle, the buckle being a hollow concave portion) is provided at the outer side of the receptacle, for locking with the second connecting portion 150 of the insulating end plate.

The sealing cavity is formed by the cooperation between the insulating end plate and the receptacle, and the sealing between the sealing cavity and the outside world is achieved by three portions.

The first portion is the second passage portion 190, the sealing of the second passage portion 190 is achieved by compressing the sleeve 204 outside the lead 200 through the first baffle 118 and the second baffle 134 jointly, and the sleeve 204 is a soft composite material and fills in the U-shaped concave portion of the first baffle 118 and the U-shaped concave portion of the second baffle 134 to achieve sealing.

The second portion is the cooperating structure of the first mounting groove 114 and the second mounting groove 132, and the top wall of the second mounting groove 132 abuts on the portion of the mounting plate 116 which protrudes out of the side portion of the first mounting groove 114, to achieve a preliminary sealing. The groove wall of the first mounting groove 114 cooperates with the groove wall of the second mounting groove 132, to achieve a further sealing.

The third portion is the first passage portion 112, the sealing rubber on the wiring portion 302 of the compressor 300 is in interference fit with the first passage portion 112, and the sealing rubber deforms and fills in the entirety of the first passage portion 112, to achieve the sealing.

In order to ensure the effectiveness of the sealing, the receptacle is detachably connected to the insulating end plate through a plurality of first connecting portions 140 and a plurality of second connecting portions 150.

The lead 200 comprises a conducting wire 202, a sleeve 204 and a terminal 206, and the sleeve 204 and a coil are crimped on the terminal 206 simultaneously when they are crimped.

Two guiding posts are provided on the receptacle, two guiding holes (in an embodiment, cylindrical holes) are provided in the insulating end plate, and in an assembling process, the guiding posts are in cooperative connection with the guiding holes, which has a guiding function.

From the convex portion 122 towards the edge of the first housing 110, the mounting plate 116 comprises a first plate body 1162 and a second plate body 1164; along the direction from the first housing 110 to the second housing 130, the first plate body 1162 is located above the second plate body 1164, and the convex portion 122 is connected to the first plate body 1162. The first plate body 1162 is connected to the second plate body 1164 through an inclined plane board.

The number of the second baffles 134 on the insulating end plate is two. The number of the first baffles 118 on the receptacle is two.

A limiting part for fixing the terminal 206 of the lead 200 is provided on the bottom portion of the sealing cavity. The limiting part comprises a sinking cylindrical hole and a narrow U-shaped groove.

An identification portion 180 is provided on the insulating end plate for distinguishing the lead 200.

In the present disclosure, the term of "multiple" indicates two or more, unless otherwise explicitly specified or defined. The terms of "mounting", "connected to", "connection", "fixing" and the like should be understood in a broad sense, in an embodiment, the term "connection" may be a fixed connection, and may further be a removable connection, or an integral connection; and the term of "connected to" may be a direct connection and may further be an indirect connection through an intermediate medium. A person of ordinary skills in the art could understand the specific meanings of the terms in the present disclosure according to specific situations.

In the description of the present specification, the descriptions of the terms "one embodiment", "some embodiments" and "specific embodiments" and the like mean that specific features, structures, materials or characteristics described in combination with the embodiment(s) or example(s) are included in at least one embodiment or example of the present disclosure. In the specification, the schematic representation of the above terms does not necessarily refer to the same embodiment or example. Moreover, the particular features, structures, materials or characteristics described may be combined in a suitable manner in any one or more embodiments or examples.

The descriptions above are only some embodiments of the present disclosure, and are not configured to limit the present disclosure. For a person skilled in the art, the present disclosure may have various changes and variations. Any modifications, equivalent substitutions, improvements and etc. made within the spirit and principle of the present disclosure shall all be included in the protection scope of the present disclosure.

What is claimed is:

1. A cover plate assembly for an electric motor, the cover plate assembly comprising:
   a first housing:
      comprising a mounting plate;
      forming at least one first passage portion;
      forming a first mounting groove located at one side of the mounting plate, wherein a portion of the mounting plate protrudes out of a side portion of the first mounting groove; and
      comprising at least one first baffle, wherein:
         the first baffle and the first mounting groove are located on a same side of the mounting plate;
         the first baffle forms a first concave portion; and
         the first concave portion is in communication with the first mounting groove; and
   a second housing:
      detachably connected to the first housing;
      forming a second mounting groove, wherein:
         the first mounting groove extends into the second mounting groove;
         a protrusion direction of the second mounting groove is opposite to a protrusion direction of the first mounting groove; and a top wall of the second mounting groove abuts the portion of the mounting plate that protrudes out of the side portion of the first mounting groove; and comprising at least one second baffle, wherein:

the second baffle forms a second concave portion proximate the first concave portion of the first housing;

the second concave portion is in communication with the second mounting groove;

a concaving direction of the second concave portion is opposite to that of the first concave portion of the first housing; and at least one second passage portion is enclosed by the first concave portion of the first housing and the second concave portion, wherein:

the first housing and the second housing form:

at least one sealing cavity in communication with the first passage portion and enclosed between an inner wall surface of the second mounting groove and an inner wall surface of the first mounting groove; and the second passage portion is in communication with the sealing cavity and configured to accept a lead of the electric motor therethrough.

2. The cover plate assembly according to claim 1, wherein:

the at least one second baffle comprises a plurality of second baffles; and the second baffles are arranged alternatively along a direction from the second baffles to the first baffle.

3. The cover plate assembly according to claim 2, wherein the at least one first baffle comprises two first baffles, and the multiple second baffles are all located between the two first baffles.

4. The cover plate assembly according to claim 1, wherein:

the first housing is provided with a first guiding portion, the second housing is provided with a second guiding portion, and the first guiding portion and the second guiding portion are connected in a cooperative manner.

5. The cover plate assembly according to claim 4, wherein one of the first guiding portion or the second guiding portion is a guiding pillar, another of the first guiding portion or the second guiding portion is a guiding hole, and the guiding pillar is insertable into the guiding hole.

6. The cover plate assembly according to claim 1, further comprising:

a first connecting portion provided in the first housing; and a second connecting portion provided in the second housing, wherein the first housing and the second housing are detachably connected by the first connecting portion and the second connecting portion.

7. The cover plate assembly according to claim 6, wherein:

one of the first connecting portion or the second connecting portion is a buckle, another of the first connecting portion or the second connecting portion is a buckling position portion, and the buckle is in buckling cooperation with the buckling position portion; or both the first connecting portion and the second connecting portion are threaded holes, the cover plate assembly further comprises a threaded component, and the threaded component is in threaded connection and cooperation with the threaded holes; or one of the first connecting portion or the second connecting portion is a limiting rib, another of the first connecting portion or the second connecting portion is a limiting socket, and the limiting rib can be inserted into the limiting socket.

8. The cover plate assembly according to claim 6, wherein:

the second connecting portion is provided on an outer wall surface of the second mounting groove, and the portion of the first housing corresponding to the second connecting portion is provided with the first connecting portion.

9. The cover plate assembly according to claim 1, wherein:

the cover plate assembly is further provided with at least one limiting part, the limiting part is located in the sealing cavity, and the limiting part is configured to limit a displacement of the lead in the sealing cavity.

10. The cover plate assembly according to claim 9, wherein:

the limiting part comprises a limiting groove and/or a limiting hole; and/or the at least one limiting part comprises a plurality of limiting parts.

11. The cover plate assembly according to claim 1, wherein:

the at least one sealing cavity comprises a plurality of sealing cavities, the at least one first passage portion comprises a plurality of first passage portions, and the at least one second passage portion comprises a plurality of second passage portions, and each of the sealing cavities is in communication with one of the first passage portions and one of the second passage portions.

12. The cover plate assembly according to claim 1, wherein:

the cover plate assembly is further disposed with an identification portion, and the identification portion is located at the second passage portion; and/or the cover plate assembly is an insulated cover plate assembly.

13. A stator comprising:

the cover plate assembly according to claim 1; and the lead, wherein at least a portion of the lead extends into the sealing cavity through the second passage portion, the lead comprising:

a conducting wire;

a sleeve, put around an outer side of the lead; and a terminal, located at one side of the sleeve, wherein the terminal is connected to the conducting wire, the terminal is provided with a bump, and the bump is in cooperative connection with a limiting part of the cover plate assembly.

14. The electric motor comprising the stator according to claim 13.

15. A compressor comprising:

the electric motor according to claim 14; and a wiring portion, wherein the wiring portion extends into the sealing cavity of the electric motor through the first passage portion of the electric motor and is electrically connected to the lead, wherein the wiring portion is in interference fit with the first passage portion.

16. A vehicle comprising the compressor according to claim 15.

17. A cover plate assembly for an electric motor, the cover plate assembly comprising:

a first housing:

comprising a mounting plate;

forming a first passage portion;

forming a first mounting groove located at one side of the mounting plate; and comprising a convex portion connected to the mounting plate, wherein:

a portion of the mounting plate protrudes out of a side portion of the first mounting groove;

the convex portion and the first mounting groove are located on opposite sides of the mounting plate; and the first passage portion is a through-hole that penetrates through the convex portion and a bottom wall of the first mounting groove; and a second housing:

detachably connected to the first housing;

forming a second mounting groove, wherein:

a protrusion direction of the second mounting groove is opposite to a protrusion direction of the first mounting groove; and a top wall of the second mounting groove abuts the portion of the mounting plate that protrudes out of the side portion of the first mounting groove the first mounting groove extends into the second mounting groove, wherein the first housing and the second housing form:

a sealing cavity in communication with the first passage portion and enclosed between an inner wall surface of the second mounting groove and an inner wall surface of the first mounting groove; and a second passage portion in communication with the sealing cavity and configured to accept a lead of the electric motor therethrough.

18. The cover plate assembly according to claim 17, wherein:

the mounting plate comprises a first plate body and a second plate body from the convex portion to an edge of the first housing;

the first plate body is located above the second plate body in a direction from the first housing to the second housing; and the convex portion is connected to the first plate body.

19. The cover plate assembly according to claim 17, wherein along a direction from the first housing to the second housing, the portion of the bottom wall of the second mounting groove corresponding to the through-hole is located above the portion of the bottom wall of the second mounting groove corresponding to the second passage portion.

* * * * *